United States Patent [19]
Kinoshita et al.

[11] Patent Number: 6,157,165
[45] Date of Patent: Dec. 5, 2000

[54] BATTERY APPARATUS AND CONTROL SYSTEM THEREFOR

[75] Inventors: Takuya Kinoshita; Hideki Miyazaki; Akihiko Emori, all of Hitachi; Takahiro Nomura, Niigata, all of Japan

[73] Assignee: Hitachi, Ltd., Tokyo, Japan

[21] Appl. No.: 09/413,469

[22] Filed: Oct. 6, 1999

[30] Foreign Application Priority Data

Oct. 6, 1998 [JP] Japan .................................. 10-283791
Dec. 17, 1998 [JP] Japan .................................. 10-358666

[51] Int. Cl.[7] .......................... H01M 10/44; H01M 10/46
[52] U.S. Cl. ............................................ 320/116; 320/118
[58] Field of Search ..................................... 320/101, 110, 320/116, 118, 119, 121, 140, FOR 114, FOR 115, FOR 148, FOR 160; 363/62

[56] References Cited

U.S. PATENT DOCUMENTS 5,814,970  9/1998  Schmidt .................................. 320/118
5,932,932  8/1999  Agatsuma et al. .................. 320/116 X
6,064,178  5/2000  Miller .................................. 320/118 X

FOREIGN PATENT DOCUMENTS 7-298516   4/1994   Japan .
10-191573  12/1996  Japan .

*Primary Examiner*—Edward H. Tso
*Attorney, Agent, or Firm*—Antonelli, Terry, Stout & Kraus, LLP

[57] ABSTRACT

A battery apparatus has a first switch connected to a battery; a first electric energy storing device, such as a capacitor, connected to the battery through the first switch; a second switch connected to the first electric energy storing device; and a voltage detecting device having an input terminal which is selectively connected to the first electric energy storing device through the second switch.

16 Claims, 13 Drawing Sheets

BATTERY APPARATUS AND CONTROL SYSTEM THEREFOR

BACKGROUND OF THE INVENTION

The present invention relates to a battery apparatus comprising an electricity storing device having a battery, such as a secondary battery, and a control system therefor.

In recent years, various kinds of electric energy storing devices, such as a secondary battery and a capacitor (hereinafter, referred to simply as a battery) have been widely used as a clean energy source for a vehicle. However, it is sometimes difficult to increase the voltage or power capacity of a battery, and so a plurality of unit batteries are often used by connecting them in series or in parallel.

In a case of connecting a plurality of batteries in series, when the batteries individually vary in electric power capacity, initial voltage or temperature, it is difficult to uniformly share voltage among the batteries. Particularly, in a case where lithium secondary batteries or electric double layer capacitors using an organic solvent as the electrolyte are connected in series, a variation in terminal voltage of the batteries causes over-discharge to occur, resulting in degradation of performance and shortening of the life of the batteries.

In the case of lithium secondary batteries, a protective function is typically provided to stop charging or discharging of the batteries when an over-charge or over-discharge condition of the secondary batteries is detected. In a case where a plurality of lithium secondary batteries having such a protective function are connected in series, the safety of the batteries can be secured by stopping the charging at a time when the voltage of some of the secondary batteries which have a high initial voltage, reaches an over-charge protective level. However, charging of the remaining secondary batteries, which have a low initial voltage, is stopped in this case in the middle of charging before they have been charged sufficiently. Similarly, discharging is stopped at the time when the voltage of the secondary batteries, which have a low initial voltage, reaches an over-discharge level; and, in this case as well, the discharging of the secondary batteries, which have a high initial voltage, is stopped while they still store a sufficient quantity of electricity.

As described above, when a plurality of batteries having a protective function to prevent over-charge and over-discharge of the batteries are connected in series, the available electric capacity is only a part of the electric power capacity which may be obtainable with all of the plurality of batteries, and, accordingly, the availability of the electric power is reduced. In order to avoid such a problem, it is necessary to take measures to ensure that an initial voltage of each of the batteries connected in series is accurately detected, and the voltages of all the batteries are made uniform when the initial voltages of some of the batteries are different from the initial voltage of the other batteries.

Further, there has been a recent trend in which lithium secondary batteries, nickel-metal hydride secondary batteries, and electric double layer capacitors are used for storing electricity for an electric vehicle. However, in any type of these batteries, it is requited to accurately measure the quantity of electricity stored in the batteries. In measuring the quantity of stored electricity (hereinafter, referred to as a remaining quantity measurement), the terminal voltage of a battery is measured and a remaining quantity of charge is estimated from the terminal voltage and an SOC (state of charge; percentage of remaining quantity on the basis of a full charge of 100%). In the estimation, a highly accurate calculation is performed by taking into consideration a change in internal resistance of the battery due to the temperature or age of the battery. In such a remaining quantity measurement, the voltage of the battery must be measured with a high accuracy of several tens of mV.

An example of a method of detecting the voltage of batteries connected in series is disclosed in Japanese Patent Application Laid-Open No.10-191573. In the battery charging system using this conventional technology, a secondary battery group is composed of a plurality (three, in this example) of secondary batteries connected in series. A discharging circuit is connected in parallel to each of the secondary batteries. A switching circuit is provided. The switching circuit selects one set out of three sets of input terminals, each set being composed of two input terminals, to connect to the output terminals, and each of the three sets of input terminals is connected in parallel to each of the secondary batteries. Input terminals of a differential amplifier are connected to the output terminals of the switching circuit, and output terminals of the differential amplifier are connected to analogue input terminals of a micro-controller.

In this conventional system, the micro-controller outputs a signal to select a +terminal and −terminal of a secondary battery using the switching circuit. A voltage of the secondary battery transmitted to the differential amplifier through the switching circuit is transmitted to the micro-controller from the differential amplifier. The micro-controller then successively outputs a signal to the switching circuit to select the next secondary battery. The voltages of the other secondary batteries are successively selected by the switching circuit in a similar manner and the values thereof are read and stored in the micro-controller. The micro-controller turns on a switch of the discharging circuit corresponding to a secondary battery having a maximum terminal voltage to effect a discharge thereof, and controls the discharging so that the voltage of the secondary battery becomes equal to the voltage of the other secondary batteries.

In the above-mentioned conventional system, there are variations in resistances of a plurality of resistors provided in the differential amplifier. Even if the variations in the resistances are approximately ±1%, an error in voltage becomes several hundreds of mV because the error in voltage detecting becomes larger as the level of the secondary battery is higher. Taking lithium secondary batteries as an example, the usable voltage range is between 2.7 V to 4.2 V, and the relationship between the voltage and the SOC is not linear. When there is a voltage error of several hundreds mV within an SOC range of 70 to 100%, the remaining charge quantity is measured with an error of several tens %. Therefore, the voltage error is preferably smaller than several tens of mV. The same can be said for nickel-metal hydride batteries. A differential amplifier ensuring variations of resistances less than ±1% is available on the market, but is very expensive.

Further, the secondary battery has an internal impedance, and, in the case of a lithium secondary battery, the internal impedance is capacitive in a low frequency range up to several kHz and inductive in frequency range above that. Therefore, when a charge current or discharge current flowing in the secondary battery varies with time (called a current ripple) or contains a disturbance, such as a surge current, the voltage of the battery contains a transient oscillation component due to the effect of the high frequency component of the current. In the voltage detection of the battery, it is required to detect a value without such a transient oscillation component.

In order to accurately detect a battery voltage in the direct current manner currently in practical use, a filter for removing any oscillation component is necessary. When a filter is selected for this purpose, it is necessary to pay attention to selection of a filter having an appropriate degree of attenuation characteristic. The objects of voltage detection in a battery are measurement of the remaining quantity, protection against over-charging and over-discharging, and compensation of a voltage imbalance in which the voltage change in response to charging and discharging current is slow; and, accordingly, the voltage may be measured on a second-by-second basis (the above-mentioned transient oscillation component is not measured). It is considered from the above that a filter having an attenuation characteristic of the second order is needed, but such a filter has a large volume.

Further, since the voltage detector constantly detects the voltage of the secondary batteries, it is preferable for the electric power consumption rate of the detecting circuit is as small as possible. Although electric power consumption rates of differential amplifiers are widely spread depending on the products, there is a limitation to how much the electric power consumption rate can be reduced because the differential amplifier is an analogue circuit and requires a bias current.

A battery is a direct current power supply, but typical loads generally require alternating current power. Further, the voltage between the terminals of the common battery changes depending on the available amount of charging and discharging power. Therefore, a battery apparatus, an electric machine or a motor using a battery needs an electric power converter, such as a DC/AC converter for controlling charging and discharging, an AC/DC converter, and/or a DC/AC inverter for converting an AC voltage to DC. A conventional uninterruptible power supply apparatus is disclosed in Japanese Patent laid-open application No. 7-298516, for example. These electric power converters generally use the chopping operation of semiconductor switches and the induced voltage produced in an inductor in the converting process. Therefore, the input and output current and voltage of these electric power converters include a large amount of high frequency ripple components changing in conjunction with the chopping operation.

When a voltage and a current contain ripple components, as described above, it is difficult to detect correct values of the voltage and the current. Particularly, this is a large problem for a battery, such as a lithium secondary battery, which needs to be controlled by accurately detecting the voltage and the current thereof. Therefore, it is necessary to remove or reduce the ripple components when the copper type electric power converter and the battery are connected. On the other hand, the copper type electric power converter uses a chopping operation by semiconductor switches and the induced voltage produced in an inductor in the converting process, as described above. Therefore, the ripple components can be-reduced to a certain degree by increasing the switching frequency or increasing the inductance.

However, in actual practice, there is a limitation to the extent to which the switching frequency or the inductance can be increased. Particularly, the switching frequency of a semiconductor switch satisfying this condition becomes lower as the current increases or the voltage increases. Further, the feasible value of inductance becomes small. In addition, the semiconductor switch and the inductor are high in price, heavy in weight and large in size.

SUMMARY OF THE INVENTION

In order to solve the above problems, in a battery apparatus and a control system for the battery apparatus, in accordance with the present invention, the voltages of the batteries are detected by detecting the voltage of an electric energy storing means, such as a capacitor, which is charged by the batteries.

A battery apparatus and a control system for the battery apparatus in accordance with the present invention are composed of a first switching means connected to a battery contained in an electricity storing means; a first electric energy storing means connected to the battery through the first switching means; a second switching means connected to the first electric energy storing means; and a voltage detecting means having input terminals which are connected to the first electric energy storing means through the second switching means.

A preferable operating feature of the apparatus is that the first switching means and the second switching means are complimentarily switched on and off. The first electric energy storing means is charged by the battery when the first switching means is switched on and the second switching means is switched off, and the voltage detecting means detects a voltage across the first electric energy storing means when the first switching means is switched off and the second switching means is switched on. Since voltage of the first electric energy storing means is detected, the effect of the resistance components in the circuit on the value of the detected voltage is small. Therefore, the accuracy of the detected voltage can be improved, and, accordingly, the reliability of the battery apparatus and the control system can be improved.

As the battery and the electric energy storing means, various kinds of secondary batteries, capacitors and condensers may be used. Semiconductor elements are preferable as the switching means, but the other circuit elements or circuit parts capable of selectively opening and closing a circuit may be used. The voltage detecting means may have a function of controlling the charging and discharging of each portion of the batteries using the detected voltage in addition to the function of voltage detection.

A battery apparatus in accordance with the present invention comprises a battery module composed of one battery or a plurality of unit batteries; and a chopper type electric power converter, wherein an inductor is inserted in series with the battery module, and a capacitor is connected in parallel with the series connection of the battery module and the inductor.

Further, a battery apparatus in accordance with the present invention comprises a battery module group formed by connecting a plurality of battery modules composed of one battery or a plurality of unit batteries in series; and a chopper type electric power converter, wherein an inductor is inserted in series with each of the battery modules, and a capacitor is across the series connection of the battery module and the inductor.

Otherwise, a chopper inductor provided in the chopper type electric power converter comprises a plurality of inductors connected in series, and a first rectifier connected in series with the inductors, and a second rectifier connected in parallel with at least one of the inductors and the first rectifier and having an inverse polarity relative to the first rectifier.

A current detecting circuit for detecting current flowing in the battery module is also provided in the battery apparatus, and a chopper inductor provided in the chopper type electric power converter comprises a plurality of inductors connected in series, a first switching means connected in series with the inductors, a second switching means connected in parallel with at least one of the inductors and the first switching means, the first and second switching means being switched accordance with a detected value of the current obtained by the current detecting circuit.

Further, in a case where the battery apparatus comprises a battery control circuit connected in parallel with the battery, it is possible for the battery to be connected in parallel with a capacitor, and the battery control circuit to be connected in parallel with the battery and the capacitor through an inductor.

In the battery apparatus having the above-mentioned configuration, the inductor inserted in series with the battery module appears as a high impedance and the capacitor connected in parallel with the battery module appears as a low impedance to the high frequency components of the electric power (the ripple components). Therefore, the high frequency components of the electric power, that is, the ripple components, are not allowed to pass through the inductor, which appear as a high impedance thereto, but they are by-passed through the low impedance capacitor.

On the other hand, the inductor inserted in series with the battery module appears as a low impedance and the capacitor connected in parallel with the battery module appears as a high impedance to the direct current power. Therefore, the direct current power does not pass through the capacitor, which appears as a high impedance thereto, but passes readily through the low impedance inductor to the battery module.

Thereby, the high frequency components of the electric power, which produce bad effects on the battery and the battery control circuit, are not allowed to pass through the battery and the battery control circuit, and, on the other hand, direct current power necessary for the battery and the battery control circuit can readily pass through the battery and the battery control circuit.

Further, in the case where the chopper inductor provided in the chopper type electric power converter comprises a plurality of inductors connected in series; a first rectifier is connected in series with the inductors; and a second rectifier having an inverse polarity relative to the first rectifier is connected in parallel with at least one of the inductors and the first rectifier, whereby current flowing through the rectifiers is blocked or by-passed by the rectifiers depending on the direction of current flow. That is, the inductance value of the chopper inductor is changed depending on the direction of current flow.

Otherwise, in the case where the current detecting circuit for detecting current flowing in the battery module is provided in the battery apparatus; the chopper inductor provided in the chopper type electric power converter comprises a plurality of inductors connected in series; first switching means connected in series with the inductors; and second switching means is connected in parallel with at least one of the inductors and the switching means, whereby these switching means are switched in accordance with a detected value of the current obtained by the current detecting circuit. That is, the value of the chopper inductor is changed depending on a value of the current flowing in the battery.

By these configurations, the ripple is reduced by increasing the inductance value depending on the direction of current flow (charging or discharging) or a value of the current.

In the case where the battery apparatus comprises a battery control circuit connected in parallel with the battery; the battery is connected in parallel with a capacitor; and the battery control circuit is connected in parallel with the battery and the capacitor through an inductor, whereby the inductor appears as a high impedance and the capacitor connected in parallel with the battery module appears as a low impedance to the high frequency components of the electric power (the ripple components). Therefore, the high frequency components of the electric power, that is, the ripple components, are not allowed to pass through the inductance, which appears as a high impedance thereto, but are by-passed through the low impedance capacitor.

On the other hand, the inductor appears as a low impedance and the capacitor connected in parallel with the battery module appears as a high impedance to the direct current power. Therefore, the direct current power does not pass through the capacitor, which appears as a high impedance thereto, but readily passes through the low impedance inductor to the battery module.

Thereby, the high frequency components of the electric power, which produces bad effects on the battery and the battery control circuit do not pass through the battery and the battery control circuit, and, on the other hand, direct current power necessary for the battery and the battery control circuit can readily pass through the battery and the battery control circuit.

By these configurations, in the battery apparatus comprising the battery module and the chopper type electric power converter, the ripple in the voltage and the current is reduced.

DETAILED DESCRIPTION OF THE PREFERRED EMBODIMENT

Various embodiments of the present invention will be described below in detail with reference to the accompanying drawings.

Figure 1:
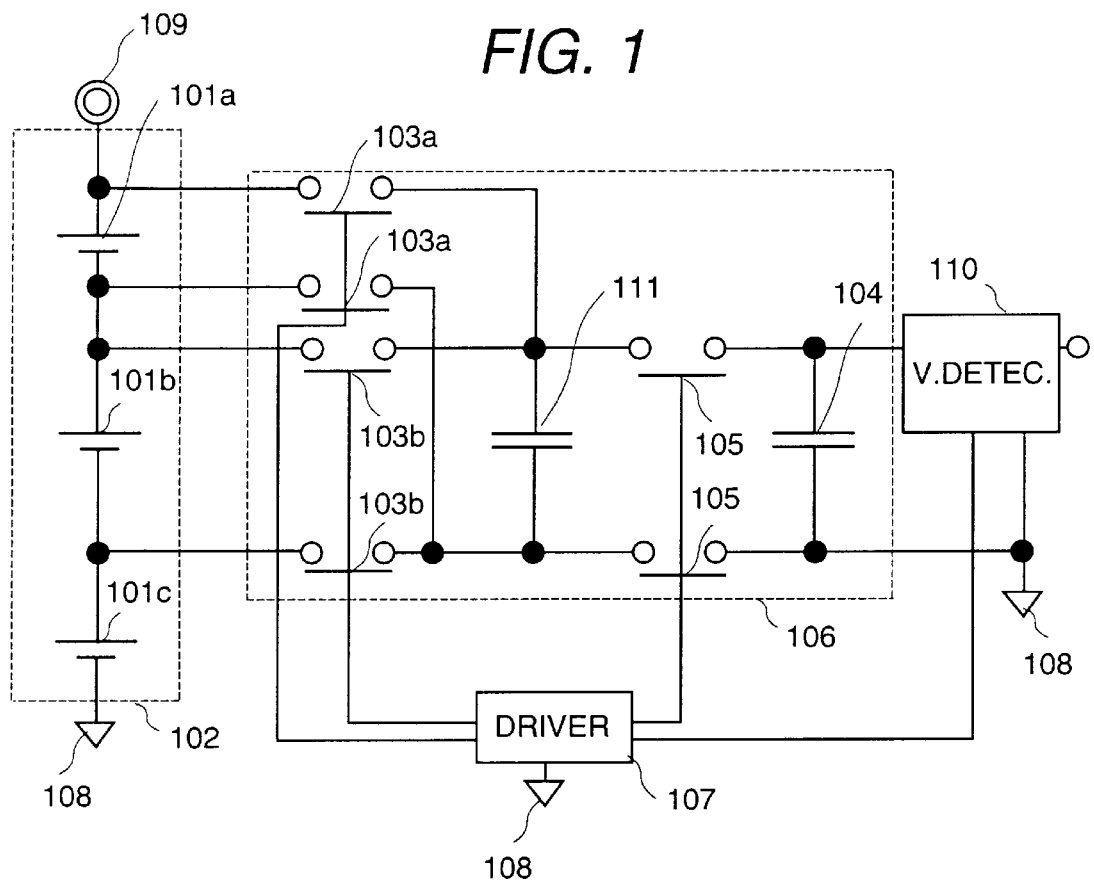
FIG. 1 is a schematic circuit diagram showing a first embodiment in accordance with the present invention.

FIG. 1 is a circuit diagram showing a first embodiment in accordance with the present invention. Referring to the figure, the reference characters 101*a* to 101*c* indicate unit batteries, and the reference character 102 generally indicates an electricity storing means in which the three unit batteries are connected in series. The reference character 109 identifies the highest electric potential terminal of the row of batteries connected in series, which is hereinafter referred to as the E+ terminal. Similarly, the reference character 108 identifies the lowest electric potential terminal of the row of batteries connected in series, which is hereinafter referred to as the E⁻ terminal. The unit battery 101*a*, having its positive pole connected to the E⁺ terminal, is connected to switching means 103*a* with contacts provided for the positive pole and the negative pole thereof, respectively, and by which the unit battery 101*a* may be selectively connected across a capacitor 111 when the switching means 103*a* is turned on. The switching means 103*a* is constructed such that the positive pole and the negative pole of the unit battery 101*a* are switched at the same timing. Here, the term unit battery means a unit for detecting a voltage, which includes not only a single battery, but also batteries are connected in series, in parallel, and in series and parallel.

Similarly, the unit battery 101*b*, which is connected to the negative pole of the unit battery 101*a*, is connected to switching means 103*b* with contacts provided for the positive pole and the negative pole, respectively, and by which the unit battery 101*b* may be selectively connected across the capacitor 111 when the switching means 103*b* is turned on. Each of the switching means 103*a* and 103*b* is operated individually in response to a respective control signal from a driver 107. Therefore, hereinafter, both switching means will be generically referred to as selecting switches. The capacitor 111 is in a floating state (in that the reference electric potential is not fixed and is a floating electric potential), and, consequently, the capacitor 111 is charged up to a voltage relative to the negative pole of one of the unit batteries 101*a* and 101*b*, when the corresponding one of the switching means 103*a* or 103*b* is turned on.

The unit battery 101*c*, which has its negative pole connected to the E⁻ terminal, also has switching means for connecting the positive pole and the negative pole thereof to the capacitor 11, but this additional switching means is omitted in the figure in an effort to illustrate the configuration of FIG. 1 in a simplified form for better understanding of the invention.

After the capacitor 111 has been charged by one of the unit batteries, the positive pole and the negative pole terminals of the capacitor 111 are switched off from the unit battery by the switching means 103 driven by a control signal from the driver, and the capacitor 111 is connected to a voltage detecting means 110 via a switching means 105. Therein, the negative pole of the capacitor 111 is connected to a terminal 108, which is at a reference electric potential (ground) of the voltage detecting means 111.

Figure 6:
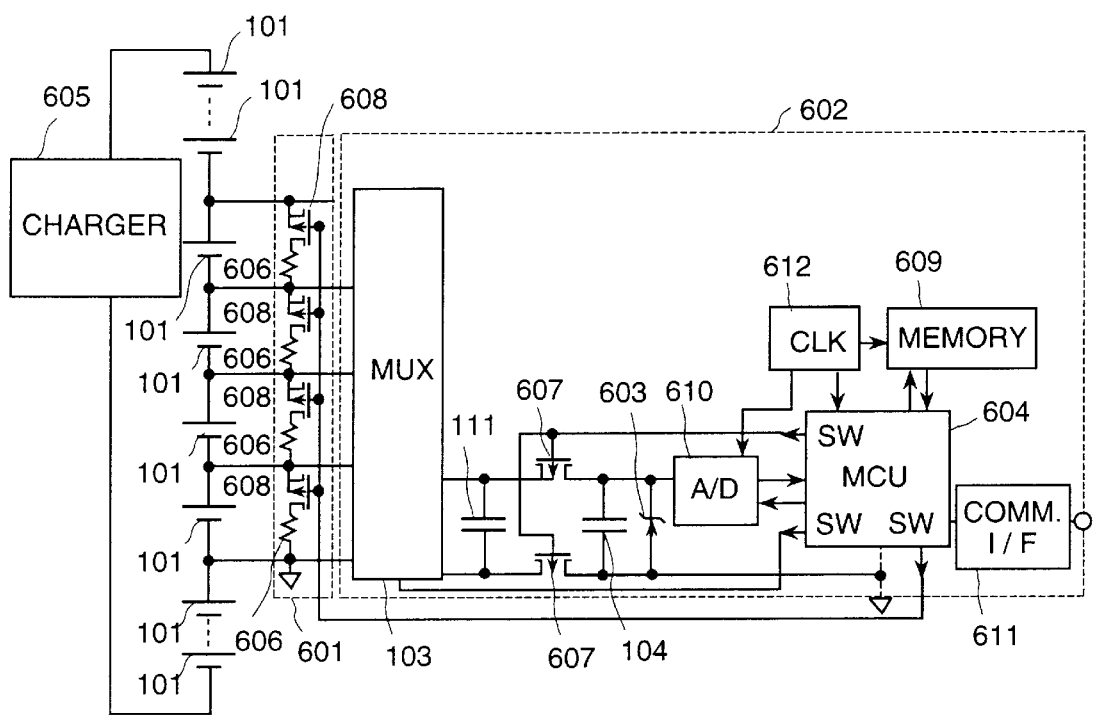
FIG. 6 is a schematic circuit diagram showing a fourth embodiment in accordance with the present invention.

When the capacitor 111 is connected to the voltage detecting means 110 by the switching means 105, the voltage sometimes transiently oscillates. Therefore, in the embodiment of FIG. 1, a capacitor 104 is disposed between the voltage detecting means 110 and the switching means 105 to remove the oscillation components. However, the capacitor 104 may be replaced by an electric energy storing means, such as a secondary battery. In a case where an oscillation component is not generated, there is no need to provide the capacitor 104. In a case where there is a possibility that a surge voltage exceeding the withstanding voltage of the voltage detecting means enters into the input of the voltage detecting means, it is preferable to place a voltage clamp circuit in parallel with the capacitor 104. This configuration is shown in FIG. 6, which will be described later. Further, since the voltage detecting means needs to complete voltage detection before the voltage of the capacitor 104 is decreased, the voltage detecting means is preferably a voltage follower type A/D converter using a JFET input operational amplifier having a small input bias current and a small input offset voltage.

Similar to the voltage detecting means 110, the driver 107 is set via the terminal 108 to the reference electric potential (ground). The driver 107 operates one of the selecting switches 103*a* or 103*b* and the switching means 105 to alternatively turn the switches on and off corresponding to a control signal received from the voltage detecting means 110. That is, the selecting switch 103 and the switching means 105 are operated in a complementary manner. Further, the voltage detecting means 110 instructs the driver 107 as to which selecting switch is to be operated, i.e. the selecting switch 103*a* or 103*b*. The detailed operation of the embodiment of FIG. 1 will be described below with reference to FIG. 2.

Figure 2:
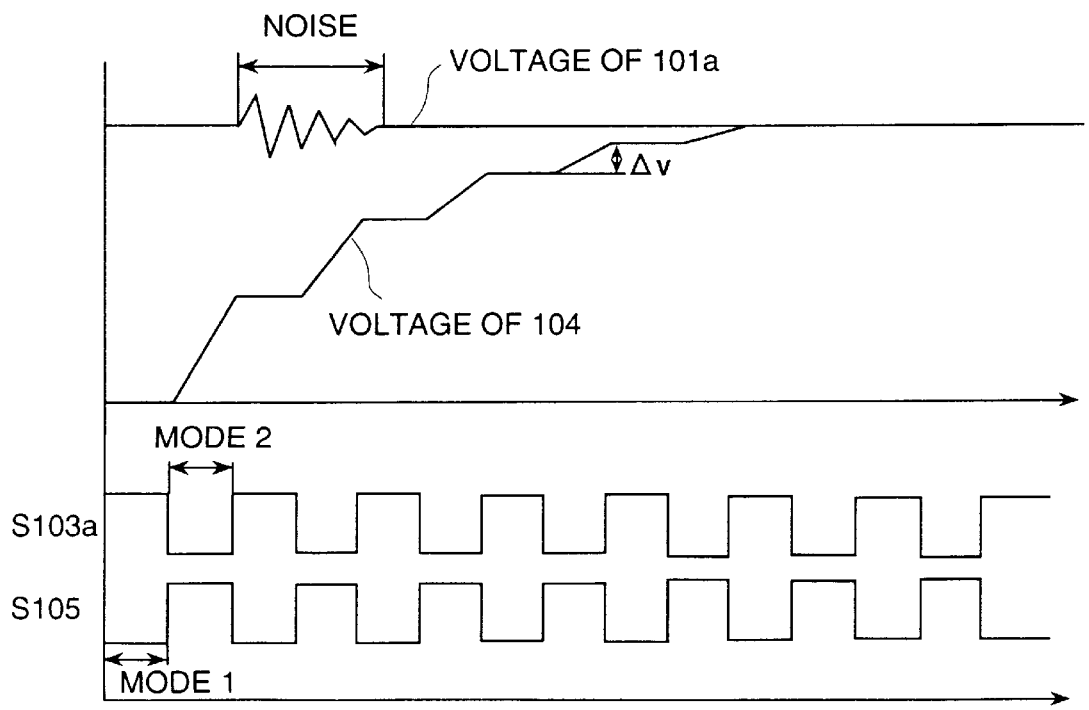
FIG. 2 is a time chart showing input and output voltages and the switching timing of the circuit shown in FIG. 1.

FIG. 2 is a time chart which shows control signals S103*a* and S105 of the switching means 103*a* and 105, respectively, in the lower section of the figure, and an input voltage to and an output voltage from the circuit arrangement indicated by the dashed line 106 of FIG. 1. Initially, in mode 1, the selecting switch 103*a* is turned on and the switching means 105 is turned off by control signals from the driver 107 so as to connect the unit battery 101*a* to the capacitor 111. At this point, the voltage of the capacitor 111 is increased exponentially with time corresponding to a difference between the voltage of the capacitor 111, at the beginning the mode 1 operation, and the voltage of the unit battery 101*a*.

Next, in mode 2, the selecting switch 103*a* is turned off and the switching means 105 is turned on by control signals from the driver 107 so as to connect the capacitor 111 and the capacitor 104 in parallel and transfer the charge in the capacitor 111 to the capacitor 104. At this time, the voltage of the capacitor 104 is also increased exponentially with time corresponding to a difference between the voltage of the capacitor 104, at the beginning the mode 2 operation, and the voltage of the capacitor 111. After that, by repeating the complementary operation of the switching means 103*a* and 105, that is, by alternatively repeating the mode 1 and the mode 2, the voltage between the terminals of the capacitor 104 will gradually approach the voltage of the unit battery 101*a*, as seen in FIG. 2.

Letting the electric potential difference of the capacitor 104 between the beginning and the ending of mode 2 be ΔV, the repeated operation of the mode 1 and the mode 2 is continued until the electric potential difference ΔV is reduced below a reference value of several tens mV. Since the voltages of the capacitors 104, 111 and the unit battery 101*a* become almost the same at the time of completion of the voltage detection, current hardly flows on the current path from the voltage detecting circuit to the battery 101*a*. Therefore, the voltage detection can be performed with a high accuracy without being affected by the resistance components on the current path.

When the voltage of the capacitor 104 to the unit battery 101a satisfies the above-mentioned convergence judging condition, the driver 107 switches on the switching means 103b in the mode 1 according to an instruction of the voltage detecting means 110. That is, the voltage detection is shifted from the unit battery 101a to the unit battery 101b. Therein, the voltage stored in the capacitor 111 is used as an initial voltage for the mode 1 and does not become a loss. Similarly, the voltage of the capacitor 104 becomes an initial voltage for the mode 2 for the voltage detection of the unit battery 101b. If the voltage of the capacitor 111 is higher than the voltage of the unit battery 101b, the capacitor 111 discharges to the unit battery 101b. Therefore, it is preferable to employ a convergence judging condition based on detection of the state when the absolute value of the above-mentioned $\Delta V$ becomes smaller than a reference value.

The voltage detecting means 110 comprises a comparing means, such as, for example, a comparator, to judge whether the convergence judging condition is satisfied or not by comparing the detected value of $\Delta V$ with a reference value. Further, the voltage detecting means 110 operates to output an instruction signal to the driver 107 to instruct the driver 107 to output driving signals for switching between the switches 103a and 103b, and for turning the switch 105 on and off in a coordinate manner, as already described. Although the voltage detecting means 110 detects the voltage change $\Delta V$ in this embodiment, the voltage detecting means 110 may simply detect the voltage the terminals of the capacitor 104 during the time the switch 105 is closed and compare the detected value with a reference value.

The transmission and consumption of energy will be considered, assuming the simplest case where the capacitance of the capacitor 104 is negligibly small compared to the capacitance of the capacitor 111. In this example, it will be assumed that transmission of energy does not exist in the mode 2, because the input resistance of the voltage detecting means 110 is sufficiently large and the capacitance of the capacitor is sufficiently small.

Letting the voltage of the battery 101a be E, the initial voltage of the capacitor 111 be VO, the final voltage be V and the capacitance of the capacitor 111 be C, in the mode 1, an energy of $0.5C(V^2-VO^2)$ is transferred from the unit battery 101a to the capacitor 111, and a charge of $C(V-VO)$ and an energy of $EC(V-VO)$ are supplied from the battery 101a to the circuit arrangement indicated by the dashed line 106 of FIG. 1. From both relationships, it is determined that an energy of $0.5C(2EV-2EVO-V^2+VO^2)$ is consumed by the ON-resistance of the switch 103 and the resistance of the wiring or the like. The consumed quantity of energy does not vary regardless of the magnitude of the resistance, but a large current may be instantaneously extracted from the battery 101a when the resistance of the wiring or the like is small. However, in actual continuous use, the value V–VO is very small because the capacitor 111 always holds a voltage very near to the voltage of the battery 101. Therefore, a large current may flow only when any one of the switches 103 is first turned on after all the switches 103 have been kept in an OFF-state for a long period. In such a case, the current can be limited to a small value by placing a resistor in the current path between the battery 101a and the capacitor 111. Further, by using a resistor in this way, a filter function, to be described later, will be improved. If there is no possibility, due to the capacitance C and the characteristic and the rated current capacity of the switch 103a, that the switch 103a will be damaged, there is no need to use the resistor as suggested above.

In order to suppress the energy loss to a small value without changing the voltage of the battery 101a, it is preferable that the capacitances of the capacitors 111 and 104 are set to values sufficiently small relative to the battery 101a. The capacitance of the protective capacitor 104 of the voltage detecting circuit is generally small enough not to accumulate and release a sufficient amount of energy to damage the switch 105. However, if the capacitance of the capacitor 104 is increased, it is necessary to place a resistor in the current path between the capacitors 111 and 104.

FIG. 2 shows a case where a high frequency disturbance (noise) is superposed on the voltage of the unit battery 101a. In this case, in the mode 1, the voltage of the noise is divided into the resistance components of the selecting switch and so on, as well as the capacitor 111, and, consequently, the effect of the noise on the voltage between the terminals of the capacitor 111 becomes smaller as the frequency of the noise is higher. On the other hand, in the mode 2, the voltage between the terminals of the capacitor 111 is not affected by the noise because the selecting switch 103 is switched off. The noise is being damped down while the modes 1 and 2 are repeated, and the voltage detection is completed when the voltage change $\Delta V$ becomes smaller than the reference value. In a case where the voltage change $\Delta V$ fluctuates at a voltage $\alpha$ above the reference value, that is, becomes $\pm\alpha$, it is preferable that the voltage detecting means 110 detects this state and averages the voltage change $\Delta V$. In order to do this, the voltage detecting means 110 is preferably provided in the form of a microprocessor having a calculation function as well as an A/D converter.

Figure 3:
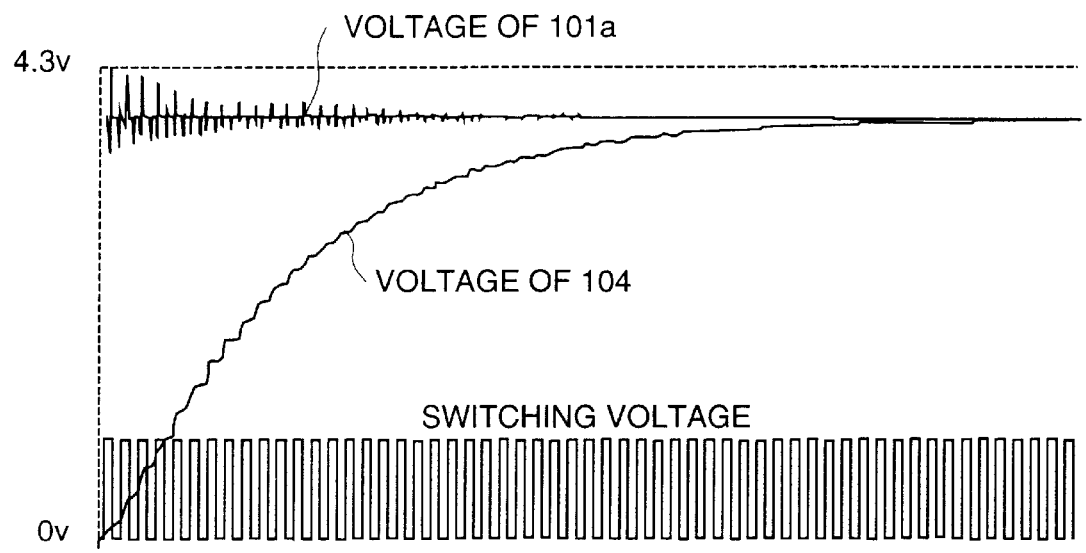
FIG. 3 is a time chart showing input and output voltages and the switching timing of the circuit shown in FIG. 1.

FIG. 3 shows an example of the operational waveforms of the embodiment of FIG. 1. The effect of the present embodiment will be described like that of a low-pass filter. As shown in FIG. 2, the voltage of the capacitor 104 is exponentially increased up to the terminal voltage of a connected unit battery as the switching modes are repeated. The waveform of FIG. 3 is equivalent to the waveform in a case where a step response of a low-pass filter is digitally sample-held. Therefore, from the corresponding relationship between the step response and the filter effect, the present embodiment has an effect similar to that of a digital low-pass filter.

When the filter effect is required to be reinforced, by taking any one or a plurality of the measures that ① the capacitance of the capacitor 111 is set to be small compared to that of the capacitor 104, ② the resistance components is increased, and ③ the switching timing is delayed, the frequency of the response can be made low, and the performance as a low-pass filter can be improved to suppress the peak voltage of the noise. On the contrary, when the noise in the input voltage is small and the demand for a response speed is stronger than that for the filter effect, measures should be taken which are opposite to the above measures ①, ② and ③. In a case of not using the capacitor 104, the filter effect in this embodiment becomes an RC filter effect composed of the capacitor 111 and the resistance components.

In a case where the unit battery 101 is a lithium secondary battery, the average voltage is 3.6 V, and the electric potential of the E$^+$ terminal 109 becomes 10.8 V on the basis of the E$^-$ terminal 105. Further, in a case where the voltage detecting circuit is composed of an A/D converter with a general rated power supply voltage of 5 V and an MCU (microcomputer), the voltage of the E$^+$ terminal 109 can not be directly applied to the A/D converter because of the withstanding voltage of the elements of the voltage detecting circuit. However, according to the circuit configuration of FIG. 1, the voltage of the unit battery 101a is first transferred to the capacitor 111 in the floating state, and then it is converted to a voltage of the capacitor 104, on the basis of the E⁻ terminal 108 as the reference electric potential, using the switch 105. Therefore, the voltage applied to the A/D converter becomes lower than the withstanding voltage of the A/D converter. In other words, the battery apparatus of the present invention has a function to perform electric potential level conversion of a voltage of battery. From this viewpoint, the circuit arrangement indicated by the dashed line 106 of FIG. 1 hereinafter will be referred to as an electric potential level converting means.

Summarizing the above, since the currents flowing in the unit battery 101 and each of the switches approach 0 (zero) when a nearly equal voltage is held in the capacitor 111 or in the capacitor 104 and the capacitor 111, the voltage between the terminals of the unit battery 101 can be transferred to the voltage detecting circuit with a high accuracy while the electric potential level is being converted without being affected by the effects of the internal inductance of the unit battery 101, the ON-resistance of each of the switches and the various resistance components.

Further, since the battery apparatus of the present embodiment does not use any differential amplifier, which is in contrast to the conventional technology, the consumed current can be reduced and at the same time the cost can be reduced.

As described above, according to the present embodiment, it is possible to obtain an electricity storing control system which has relatively few circuits, and is low in price, small in size, small in consumption of electric power, high in detecting accuracy, high in noise resistance and high in reliability.

Figure 4:
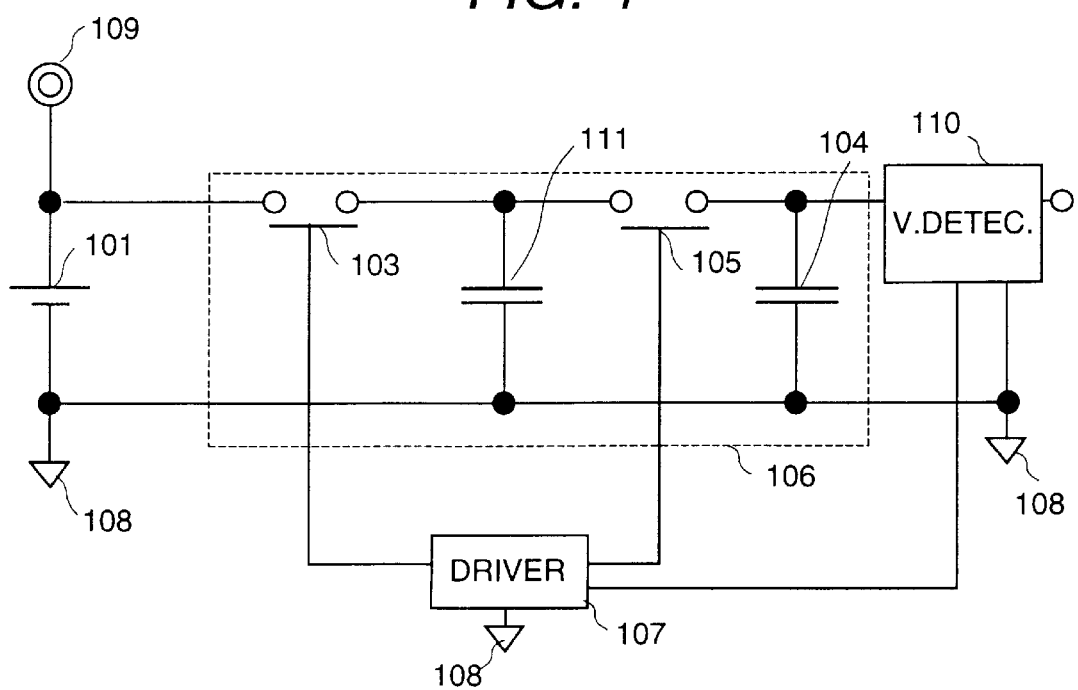
FIG. 4 is a schematic circuit diagram showing a second embodiment in accordance with the present invention.

FIG. 4 is a circuit diagram showing a second embodiment in accordance with the present invention. When the filter effect is required for controlling a single battery, a single selecting switch 103 and switching means 105 may be used, and the terminals of the capacitors 111, 104 on the side not connected to the switches can be directly connected to the terminal of the battery 101. The capacitor 111 may be in the floating electric potential state, as in the previous embodiment.

Figure 5:
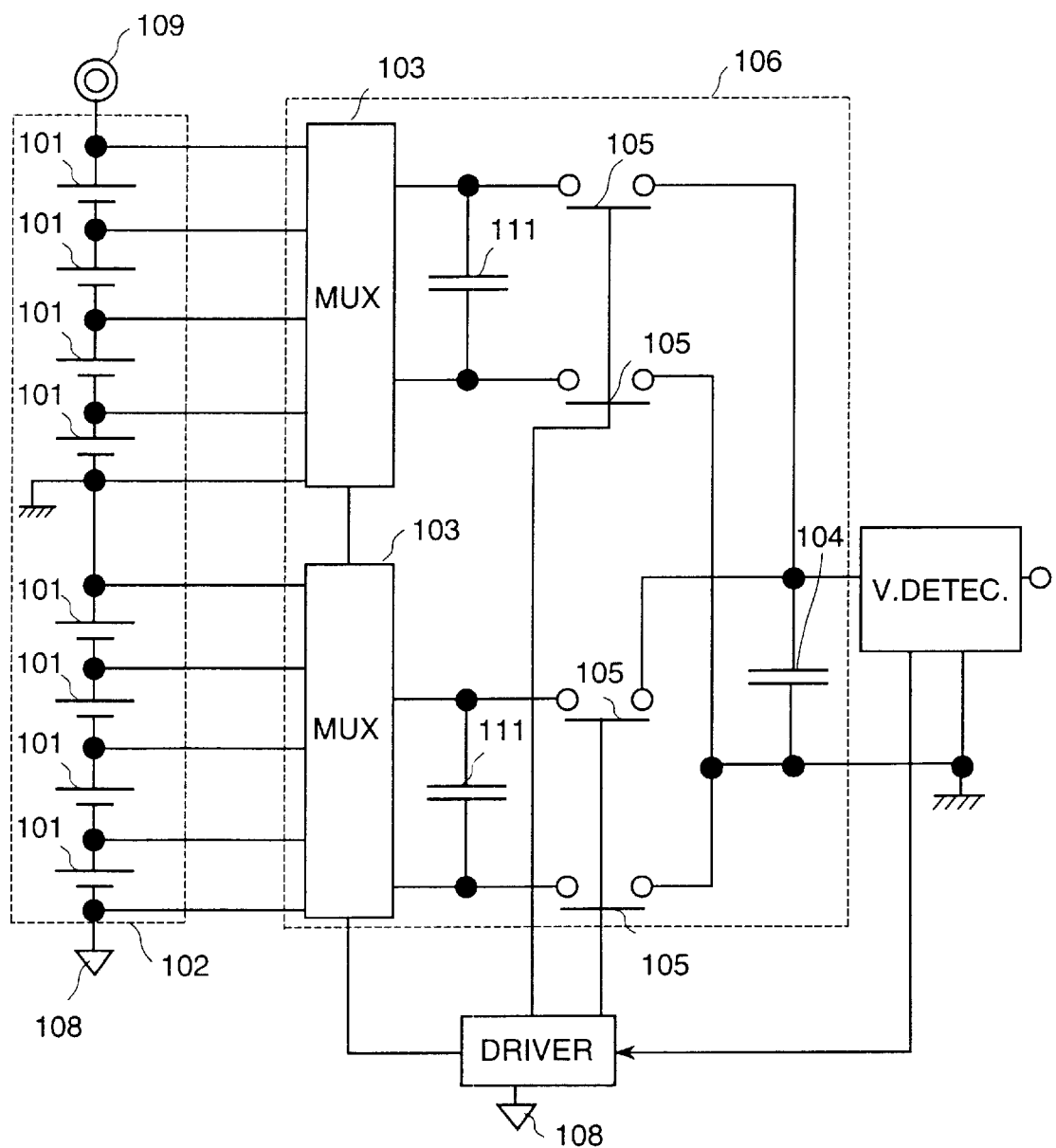
FIG. 5 is a schematic circuit diagram showing a third embodiment in accordance with the present invention.

FIG. 5 is a circuit diagram showing a third embodiment in accordance with the present invention. A respective selecting switch 103, similar to that of FIG. 1, is provided for each group of four unit batteries 101. Each selecting switch 103 is constructed in the form of a multiplexer MUX which operates to connect a positive pole and a negative pole of each of the unit batteries to a capacitor 111, in the same manner as the selecting switch 103*a* in FIG. 1. Further, the selecting switches 103 are controlled by a driver 107, as in FIG. 1. Multiplexers of 4 or 8 channels are commercially available. In the embodiment of FIG. 5, eight unit batteries are connected in series, and a circuit, including a capacitor 111, a switch 105 and a multiplexer for four channels operating as a selecting switch 103, is connected to each of the upper four unit batteries and the lower four unit batteries, respectively.

Therein, in a case where a withstanding voltage of elements of the switching means inside the multiplexer is lower than the voltage of the eight unit batteries connected in series, as shown in FIG. 5, one capacitor 111 is used for four unit batteries so that the reference voltage of each of the multiplexers is set to the lowest voltage of the unit batteries associated with each of the multiplexers. At the same time, by setting the reference voltage of the voltage detecting circuit to a voltage of the central terminal of the battery 102, not the E⁻ terminal, voltages of the eight unit batteries can be detected, though the voltage corresponding to four unit batteries is applied to a respective multiplexer.

FIG. 6 is a circuit diagram showing a fourth embodiment in accordance with the present invention. Referring to FIG. 6, the reference character 101 denotes a unit battery similar to that in the embodiment of FIG. 1, and a selecting switch 103 (multiplexer MUX) for connecting a positive pole and a negative pole of each of the unit batteries is similarly provided. A MOSFET 607 operates as the switching means indicated by the reference character 105 in FIG. 1, and the basic function of the MOSFET 607 is the same as that of the switching means 105 in FIG. 1. A capacitor 104 also functions similarly to the capacitor 104 in FIG. 1. In FIG. 6, a zener diode 603, which is connected in parallel to the capacitor 104, limits the voltage so that the voltage of the capacitor 104 becomes lower than the withstand voltage of an A/D converter 610 in the next stage. The A/D converter 610 and a microcomputer (MCU) 604 correspond to the voltage detecting means 110 in FIG. 1. In FIG. 6, the driver 107 of FIG. 1 is contained in the MCU (microcomputer) 604. Therein, the reference character 612 indicates a clock generating means, and the reference character 609 indicates a memory. Although the functions of these elements will normally be incorporated in the MCU 604, they are shown outside the MCU in the embodiment of FIG. 6 in order to make it easy to understand each of the functions. The clock generating means 612 supplies clock pulses to the A/D converter 610, the MCU 604 and the memory means 609 to provide a basic timing for digital processing.

The voltage of each unit battery is transmitted to the A/D converter 610 though the capacitors 111 and 104, so that the analogue voltage value thereof is converted into a digital value. The digital voltage value is supplied from the A/D converter 610 to the MCU 604 to determine whether or not the absolute value of the voltage changing amount ΔV of the capacitor 104 in the mode 2 has been reduced below the reference value, as described previously. The MCU 604 also transmits a control signal to the selecting switch 103 and the MOSFET 607 to perform a repetition of the above-mentioned operations of the mode 1 and the mode 2. When the voltage changing amount ΔV is reduced below the reference value, the MCU 604 selects another unit battery using the selecting switch 103 and performs a repetition of the operations of the mode 1 and the mode 2. The MCU 604 sequentially reads the voltage of each of the batteries through the A/D converter and transmits the voltage information of each of the batteries to a higher level controller, not shown, through a communication I/F (interface) 611.

A bypass circuit 601 having series connected circuits is connected in parallel to the unit batteries. Each of the series connected circuits is composed of a current bypass FET 608 and a resistance means 606 connected between a positive pole and a negative pole of each of the unit batteries. Each of the FETs 608 is switched on and off by a gate signal output from the MCU 604. Gate signal lines from the MCU 604 to the FETs 608 are illustrated by a single line in FIG. 6, although, in actuality, a gate signal is independently input to each of the FETS. The MCU 604 sets an ON-OFF duty cycle of a gate signal to the FET 608 of the bypass circuit connected to each of the unit batteries corresponding to a detected voltage of each of the unit batteries to adjust the discharge current. Instead of using the detected voltage to set the ON-OFF duty cycle of the FET 608, a calculated value of the quantity of stored electricity may be used by calculating the stored electricity of the unit battery from the detected voltage in the MCU. It is necessary to store as much energy in the unit battery 101 as possible, but there is a limitation based on the full-charge voltage. Therefore, it is required to charge all the unit batteries up to the full-charge voltage with a high accuracy. In order to do so, the terminal voltages of the units batteries are detected while they are being charged, and the charging speed of the unit battery 101 having a high voltage is decreased by switching on the FET 608 of the current bypass circuit 601 connected in parallel to the unit battery 101 having the high voltage to bypass the charging current. When a voltage of the unit battery 101 having a high voltage at the initial stage becomes equal to the voltages of the other unit batteries due to the current bypass, the current bypass FET 608 is again switched off.

In the conventional method, all the surplus energy is thrown away by allowing the current to flow through a bypass resistance means. However, the circuit configuration in the present embodiment operates to make the voltages of the unit batteries uniform. That is, when the capacitors 111 and 104 are switched from a unit battery having a higher voltage to a unit battery having a lower voltage, the capacitors hold the higher voltage of the unit battery and the charge is transferred from the capacitor 111 to the unit battery having the lower voltage. On the other hand, when the capacitors 111 and 104 are switched from a unit battery having a lower voltage to a unit battery having a higher voltage, energy is transferred from the unit battery having the higher voltage to the capacitors 111 and 104. As a result, the charge voltages of the unit batteries can be made uniform.

From the viewpoint of energy, part of the energy extracted from the unit battery 101 having the higher voltage is consumed by the resistance component between the capacitor 111 and the unit battery 101 in the process of transferring the charge from the unit battery 101 to the capacitor 111 and in the process of transferring the charge from the capacitor 111 to the unit battery 101 because of the voltage drop which occurs in the process of transferring the charge. Letting the voltage of the unit battery having the higher voltage be Vh and the voltage of the unit battery having the lower voltage be Vl, in a case where the capacitance of the capacitor 104 is sufficiently small compared to the capacitance of the capacitor 111, a ratio of a quantity of energy transferred between the unit batteries to a quantity of energy consumed by the resistance component becomes Vl:Vh−Vl, and the variations of voltage can be corrected with a higher efficiency, since the variations in voltage between the unit batteries are small. By employing this method, the voltage of the batteries can be always made uniform with a high efficiency by correcting the variations in the voltage while always monitoring the voltages of the unit batteries 101 during the time the batteries 101 are being used.

Figure 7:
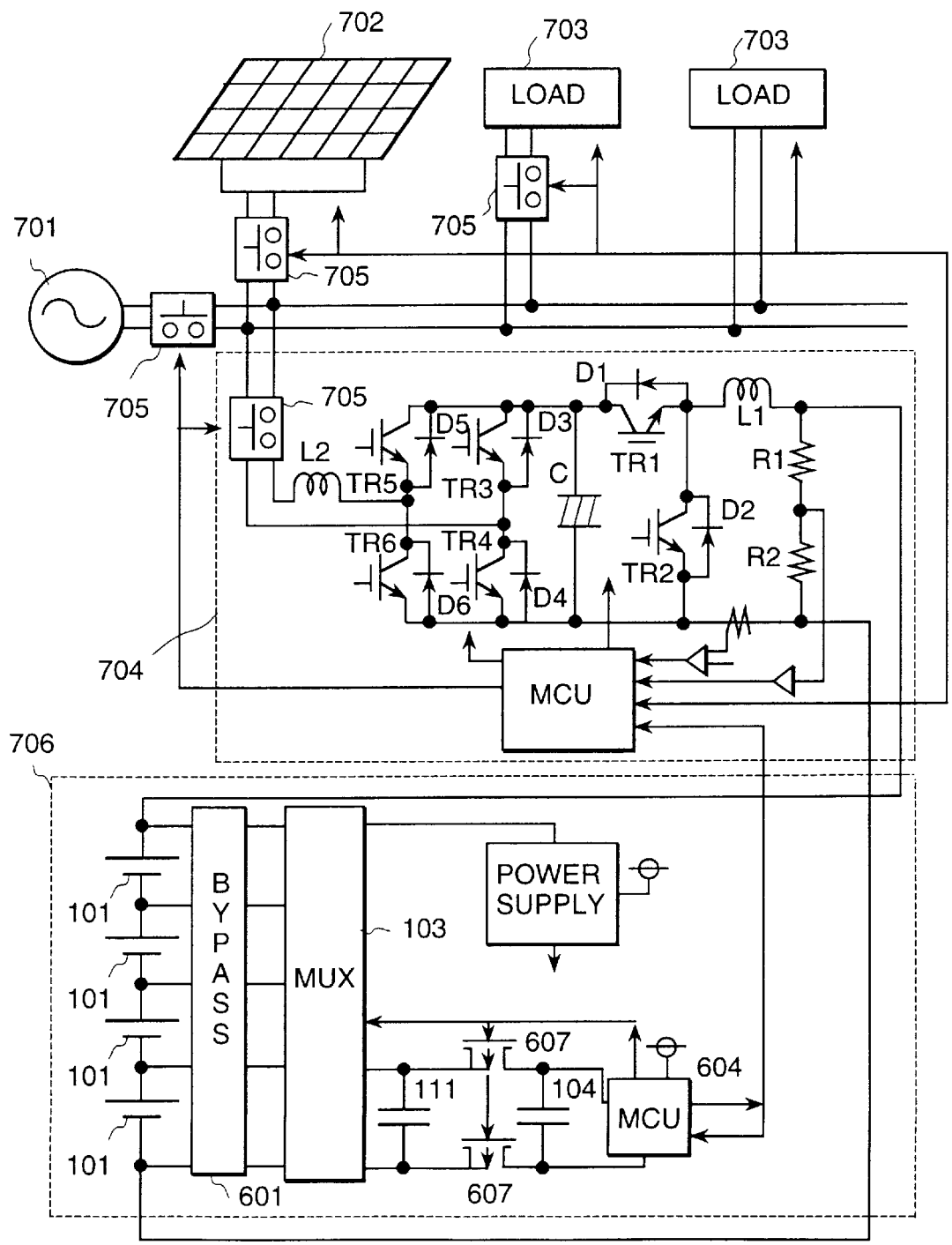
FIG. 7 is a schematic circuit diagram showing a fifth embodiment in accordance with the present invention.

FIG. 7 is a circuit diagram showing a fifth embodiment in accordance with the present invention. In the figure, the reference character 701 denotes a commercial power supply, the reference character 702 denotes a solar-electric power generator, the reference character 703 designates various loads, the reference character 704 identifies a charging and discharging control converter, and the reference character 705 denotes a switch.

A plurality of unit batteries 101 are connected in series, and each of the unit batteries is connected to a bypass circuit 601 and a selecting switch 103. A capacitor 111 is connected to output terminals of the selecting switch 103. A capacitor 104 is connected to input terminals of an A/D converter of a microcomputer 604, and connections between the capacitor 104 and the capacitor 111 are controlled by FETs 607. Further, a charging and discharging control converter 704 is connected across both ends of the battery row, and the MCU in a battery circuit 706 and an MCU in the charging and discharging control converter 704 are connected to each other. Furthermore, the solar-electric power generator 702, the loads 703 and the charging and discharging control converter 704 are connected to the common commercial power supply 701 through the switches 705, respectively. At the same time, the solar-electric power generator 702, the loads 703, the charging and discharging control converter 704 and the switches 705 are connected with a bidirectional signal system.

The solar-electric power generator 702 is an apparatus for converting solar light to direct current electric power using a solar battery and for outputting alternating current electric power using an inverter. The loads 703 are electric appliances, such as an air-conditioner, a refrigerator, a microwave oven, lighting and electric machines, such as a motor, a computer and medical equipment. The charging and discharging control converter 704 is a charging and discharging unit for converting alternating current electric power to direct current electric power and for converting direct current electric power to alternating current electric power. Further, the charging and discharging control converter 704 also serves as a control unit for controlling the above-mentioned machines, such as the solar-electric power generator 702, the loads 703 and so on.

In some cases, these machines have the switches 705 inside the system. Further, the battery apparatus in accordance with the present invention may be formed in a connecting configuration of the charging and discharging control converter 704 and the other machines, which is different from the configuration shown in the figure.

According to the configuration shown in the figure, when the commercial power supply 701 and the solar-electric power generator 702 can not supply the electric power required by the loads 703, electric power is supplied from the batteries 101 through the charging and discharging control converter 704. On the other hand, when an excess of electric power is supplied from the commercial power supply 701 and the solar-electric power generator 702, the excess electric power is used to charge the batteries 101 through the charging and discharging control converter 704.

When the voltage between the terminals of the battery row 101 reaches a discharge stop level or a charge stop level during the discharging and charging operations described above, the battery circuit 706 transmits a signal to the charging and discharging control converter 704, and the charging and discharging control converter 704 stops the charging or discharging operation. This configuration can reduce a contract electric power capacity and the consumed electric power of the commercial power supply 701 and the rated electric power generation of the solar-electric power generator 702, and, accordingly the cost of equipment and the costs of operation can be reduced. Further, electric power is supplied from the batteries 101 to supplement the commercial power supply 701 in a certain time period when electric power is concentratively consumed, and the battery apparatus is charged up in a certain time period when less electric power is consumed. By doing so, the consumption of electric power can be made more uniform.

Furthermore, since the charging and discharging control converter 704 monitors the electric power consumed by the loads 703 and controls the loads 703, energy saving and effective use of electric power can be achieved.

Figure 8:
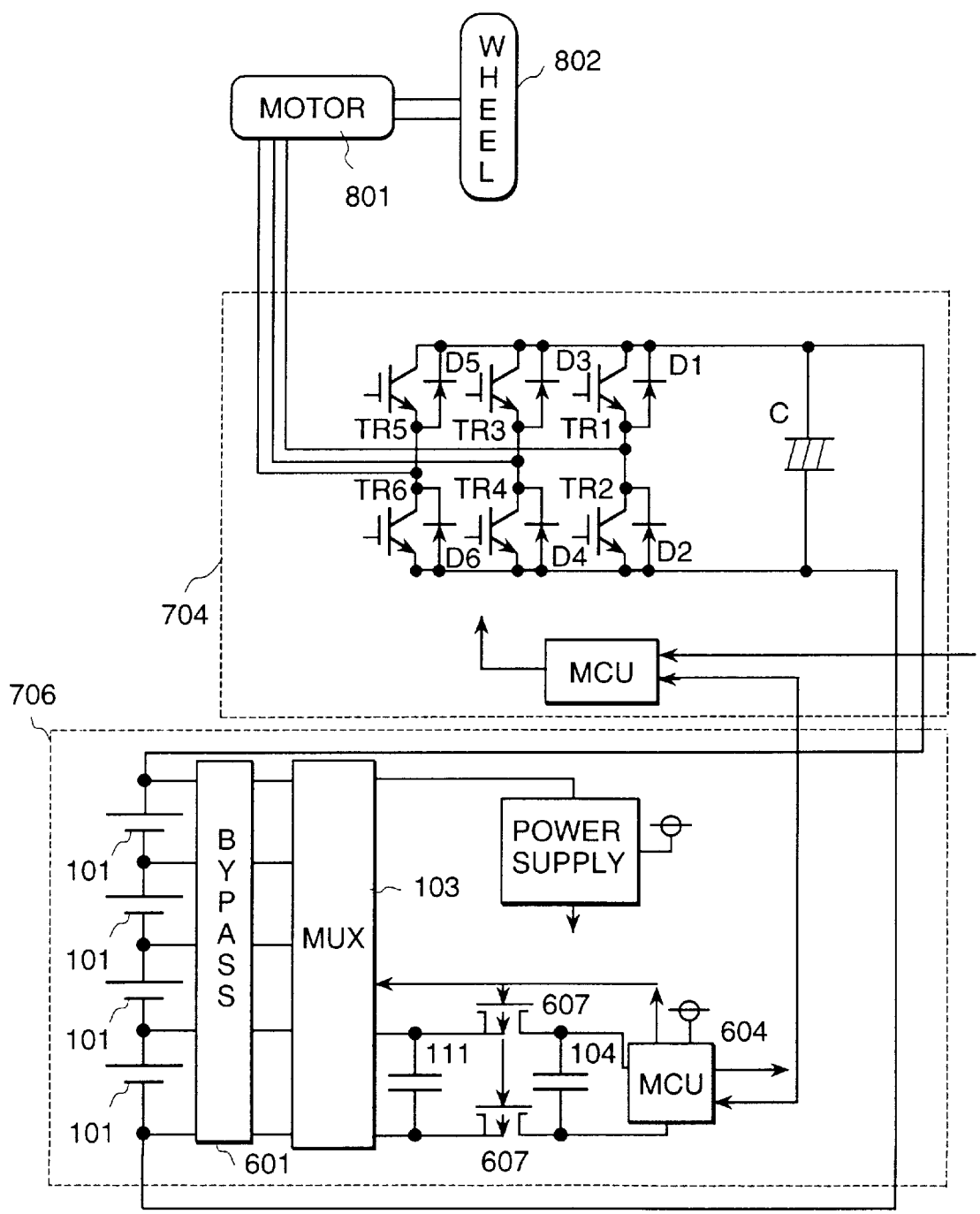
FIG. 8 is a schematic circuit diagram showing a sixth embodiment in accordance with the present invention.

FIG. 8 is a circuit diagram showing a sixth embodiment in accordance with the present invention. This embodiment provides a circuit for supplying electric power to a driving system of an electric vehicle, comprising a motor 801 and wheels 802, driven by the motor 801, which replaces the solar-electric power generator 702 and the loads 703 in the fourth embodiment of FIG. 7.

In this feature of use, since there is no means for supplying electric power from the outside to the batteries 101 during running, it is required to extract electric power from the batteries as efficiently as possible in order to lengthen the running distance.

A discharge current flows in the batteries for several seconds while the accelerator is ON, and a charge current generated by the motor flows for several seconds while the brake is ON. In addition, electric power corresponding to the kinetic energy of the vehicle always flows in and out of the batteries, and a noise caused by a current having a frequency equivalent to an integer times the number of rotations of the motor and a noise having a frequency equivalent to integer times of the clock frequency operating the inverter are superposed on the voltage of the batteries. Further, the voltage of the batteries is increased when it is charged and decreased when it is discharged due to the characteristic of the battery. Furthermore, the voltage contains fast-responding components and slow-responding components to the current. Therefore, a large volume of information is necessary to detect the voltage of the batteries in a state of no current flow while the battery is being charged and discharged, and, accordingly, it is necessary to calculate such information using a microcomputer.

In a case where a battery control system of a conventional type is used and lithium secondary batteries are used as the batteries, all the batteries are charged up to a fully charged state without any problem. However, in regard to energy extracted from the batteries, when variations of voltages occur in the batteries and the voltage of a unit battery having the lowest voltage reaches a discharge disabled voltage level, energy can not be extracted from all the batteries because of the need for protecting the batteries.

Further, in regard to noise removing measures, in the conventional battery control system, only high frequency noises are removed using an LC filter, and values of several times to several tens of times the voltage detection results are averaged using a microcomputer to remove low frequency noises, and the averaged value is employed as an actual voltage detection result.

On the other hand, in the present method, the voltages of the batteries are measured while the variations in the voltages of the batteries are being sequentially corrected with a high efficiency; and, consequently, since all of the unit batteries reach the discharge disabled voltage state at the same time, all the available energy stored in the batteries can be used, and, accordingly, the running distance can be increased compared to that of the conventional method.

Further, in regard to noise removing measures, since the battery-apparatus of the present method has a filter effect as described above, it is possible to remove the low frequency noises, which have been removed using a microcomputer in the conventional method, and, accordingly, it is possible to reduce the calculation load of the microcomputer.

Figure 9:
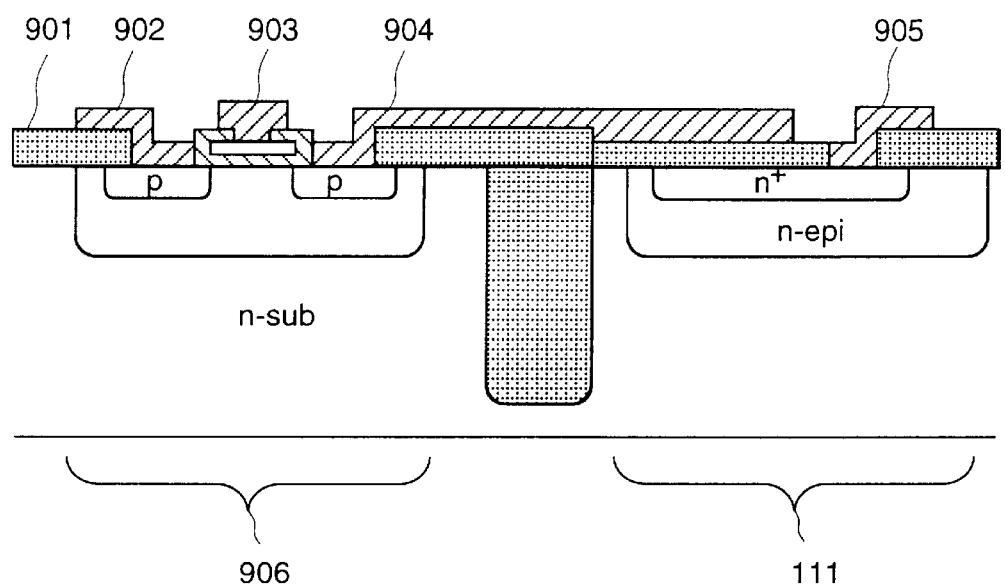
FIG. 9 is a sectional view showing a seventh embodiment in accordance with the present invention.

FIG. 9 is a view showing a seventh embodiment in accordance with the present invention. The figure shows a cross section of a part of a p-MOSFET 906 and the capacitor 111 when the battery control system in accordance with the present invention is formed with a semiconductor integrated circuit.

The p-MOSFET 906 and the capacitor 111 are formed on a single n-type substrate. The p-MOSFET 906 is composed of a source electrode 902 and a p-layer formed under the source electrode, a gate electrode 903 and an insulator of an oxide film ($SiO_2$) 901 formed under the gate electrode, a drain electrode 904 and a p-layer formed under the drain electrode, and an n-layer formed so as to float both p-layers and the gate oxide film. The capacitor 111 is formed of an insulator using the oxide film 901 and electrodes using an aluminum wiring extending from the drain electrode 904 and an $n^+$ layer connected to an electrode terminal 905.

The oxide film 901 of the capacitor is laminated so as to be thinner than the gate oxide film 901 of the p-MOSFET. Letting the thickness of the oxide film be Tox, the dielectric constant be $\epsilon$ and the area be S, the capacitance C of the capacitor 111 is expressed as $C=\epsilon S/Tox$. Therefore, the capacitance C can be made larger than the parasitic capacitance of the p-MOSFET.

As described above, according to the present embodiment, since all of the parts including the microcomputer of the battery control system can be integrated in a one-chip IC, it is possible to provide a highly reliable battery control system of small size with a low price.

Figure 10:
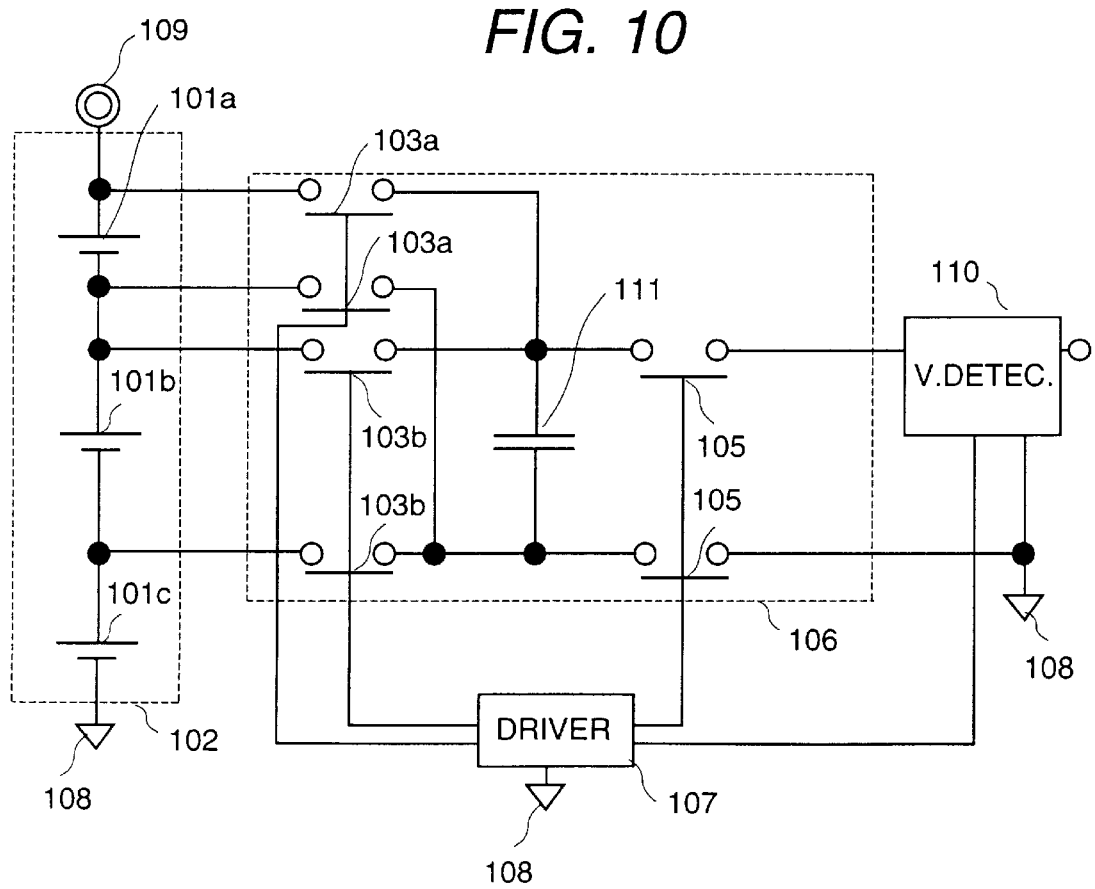
FIG. 10 is a schematic circuit diagram showing an eighth embodiment in accordance with the present invention.

FIG. 10 is a circuit diagram showing an eighth embodiment in accordance with the present invention. The main difference from the embodiment of FIG. 1 is that this embodiment does not include the electric energy storing means, that is, the capacitor 104, disposed between the switching means 105 and the voltage detecting circuit 110. The configuration and the operation of the battery apparatus are the same as those of FIG. 1, except for the above-mentioned difference and a point that the function of removing voltage oscillation components is slightly decreased when the switching means 105 is closed and the capacitor 111 is connected to the voltage detecting circuit 110. That is, in the operation of this embodiment, when the electric potential difference $\Delta V$ of the capacitor 111 at the beginning and at the ending of the mode 2 shown in FIG. 2 is reduced to a value below the preset reference value, the voltage of the capacitor 111 is detected as a voltage of the unit battery by the voltage detecting means 110. However, the present embodiment has an advantage in that the circuit configuration is simple and the size of the semiconductor chip can be decreased in a case where the battery control system is formed as a semiconductor integrated circuit, as in the embodiment of FIG. 9. In the case of a single unit battery, as shown in the embodiment of FIG. 4, a system not containing the capacitor 104 may be constructed similarly to this embodiment.

According to the present invention, the accuracy of voltage detection of the batteries can be improved, and the reliability of the battery apparatus and the control system therefor can be improved.

Ninth to fourteenth embodiments of the present invention will be described below in detail with reference to FIGS. 1 to 16. Two or more like parts in the figures are identified by the same reference character, and an explanation thereof will not be repeated.

Figure 11:
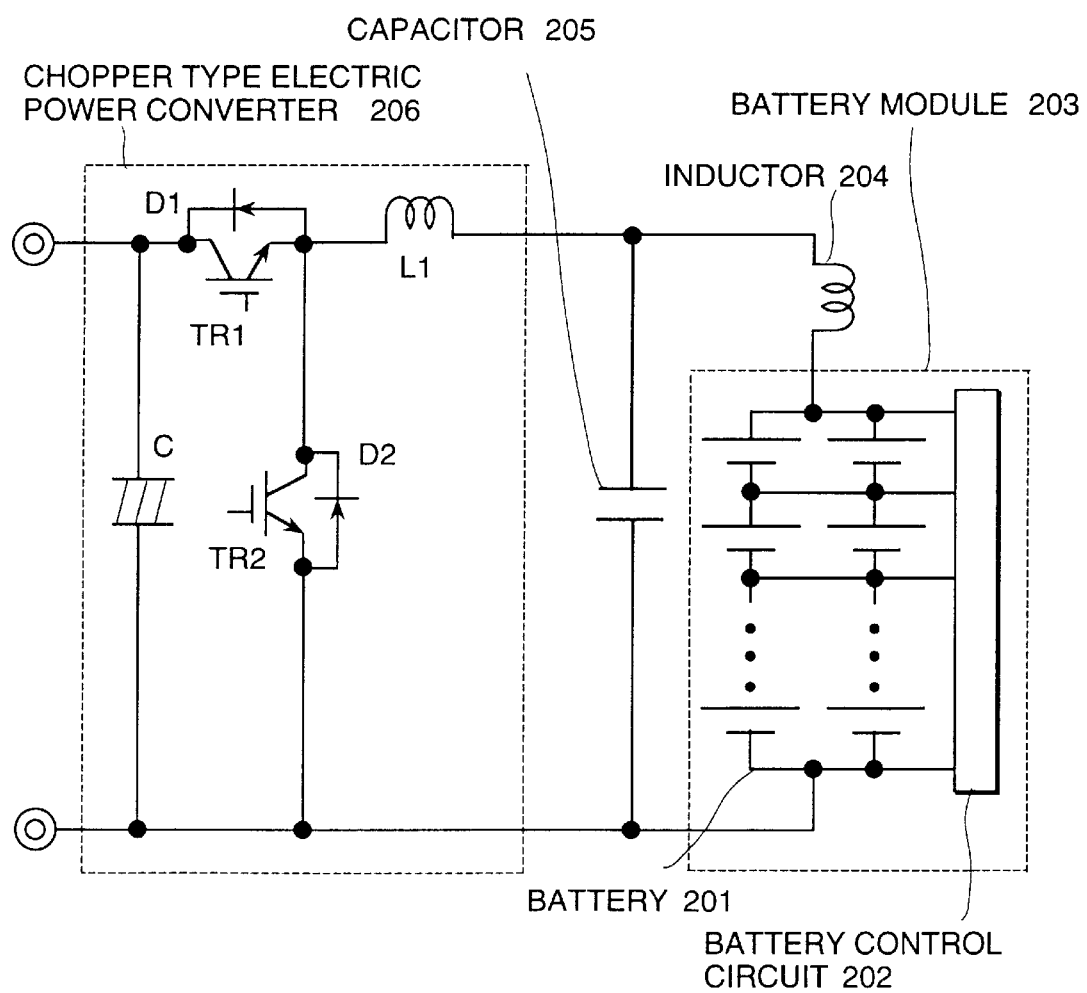
FIG. 11 is a schematic circuit diagram showing a ninth embodiment in accordance with the present invention.

FIG. 11 is a circuit diagram showing a ninth embodiment in accordance with the present invention. Referring to the figure, the reference character 201 denotes a battery, the reference character 202 denotes a battery control circuit, the reference character 203 denotes a battery module, the reference character 204 denotes an inductor, the reference character 205 denotes a capacitor, and the reference character 206 denotes a chopper type electric power converter.

The battery module 203 is constructed by connecting a plurality of unit batteries 201 in series and connecting the batteries 201 and the battery control circuit 202 in parallel.

The battery control circuit 202 is composed of a voltage detecting circuit for detecting the terminal voltage of each of the unit batteries 201, a comparing circuit for comparing these voltages and a by-pass circuit connected to the batteries for by-passing current flowing the batteries. The battery control circuit 202 performs voltage detection to judge whether or not the voltage of each of the batteries 201 is within a range of use, and adjusts any voltage imbalance between the unit batteries 201.

The inductor 204 is inserted in series with the battery module 203, and the capacitor 205 is connected in parallel with the series connection portion of the battery module 203 and the inductor 204. The chopper type electric power converter 206 is connected in parallel to these units.

The chopper type electric power converter 206 in this case is a bidirectional step-up and step-down chopper circuit. Therefore, the charging and discharging voltage and current of the battery module 203 is controlled by performing a step-down chopper operation when the battery module 203 is charged, and by performing a step-up chopper operation when the battery module 203 is discharged. The chopper type electric power converter 206 may be constructed such that the paths are separately constructed for charging and for discharging by using a unidirectional step-up chopper circuit and a unidirectional step-down chopper circuit.

With regard to the high frequency electric power (the ripple components) produced during charging and discharging operations of the chopper type electric power converter 206, the inductor 204 inserted in series with the battery module 203 becomes a high impedance and the capacitor 205 connected in parallel with the battery module 203 becomes a low impedance. Therefore, the high frequency components of the electric power, that is, the ripple components, do not pass through the inductance 204, which represents a high impedance thereto, but passes through the low impedance capacitor 205.

Assuming that a frequency of the ripple component is 16 kHz, the inductance of the inductor 204 is 10 $\mu$H and the capacity of the capacitor 205 is 100 $\mu$F, the impedance of the inductor 204 becomes 1$\Omega$ and the impedance of the capacitor 205 becomes 0.1$\Omega$. It is clear from this result that the impedance ratio of the inductor 204 to the capacitor 205 is 10:1, and, accordingly, most of the current of the ripple component flows through the capacitor 205.

Further, the values of both the inductor 204 and the capacitor 205 are very small. Particularly, in order to obtain the above value of the inductor 204 using a coil, the value can be obtained by winding a lead wire around a magnetic core with only one turn. In addition, the value may be realized by using a part easy manufacture, such as a cut-core.

The values of the inductor 204 and the capacitor 205 are very small, as described above, and accordingly, the battery apparatus can be made small in size, light in weigh and low in cost.

On the other hand, with regard to direct current power, the inductor 204 inserted in series with the battery module 203 becomes a low impedance, and the capacitor 205 connected in parallel to the battery module 203 becomes a high impedance. Therefore, the direct current power does not pass through the high impedance capacitor 205, but passes through the low impedance inductor 204. Thereby, the high frequency components of the electric power, which produce bad effects on the battery 201 and the battery control circuit 202, are not allowed to pass through the battery 201 and the battery control circuit 202, but are by-passed by the capacitor 205. On the other hand, direct current power necessary for the battery 201 and the battery control circuit 202 can readily pass through the battery 201 and the battery control circuit 202 via the inductor 204.

Accordingly, it is possible to prevent an increase in the temperature rise of the batteries 201 caused by the high frequency components of the electric power (ripple components) generated during charging and discharging operations of the chopper type electric power converter 206. Further, it is possible to avoid a reduction of the life of the battery 201 due to an increase in temperature rise and a danger, such as explosion, burst or ignition. Thus, an improvement in the life, the performance and the safety of the battery can be achieved. Furthermore, the efficiency of energy stored can be increased by reducing the thermal loss of the battery 201.

Since the ripple components in the voltage and the current are by-passed, the values of the voltage and the current of the batteries 201 can be correctly detected, and, accordingly, the reliability of the unit batteries 201 can be improved.

Since the high frequency components of the electric power passing through the battery module 203 are reduced, the chopper type electric power converter 206 may be designed so as to allow generation of more high frequency electric power. In other words, it is possible to use a low frequency semiconductor switch and an inductor having a low inductance, and, accordingly, the battery apparatus can be made small in size, light in weight and low in cost. Furthermore, a large current and high voltage battery apparatus can be made, which has been difficult in the past.

As described above, according to the present invention, the ripple component in the voltage and current can be reduced to improve the detecting accuracy and the reliability of the voltage and the current, and the temperature rise of the unit batteries can be reduced to improve the safety, the life and the performance of the unit batteries. In addition, the battery apparatus can be made light in weight, small in size, low in cost and high in safety. Further, a large current and high voltage battery apparatus can be made.

Figure 12:
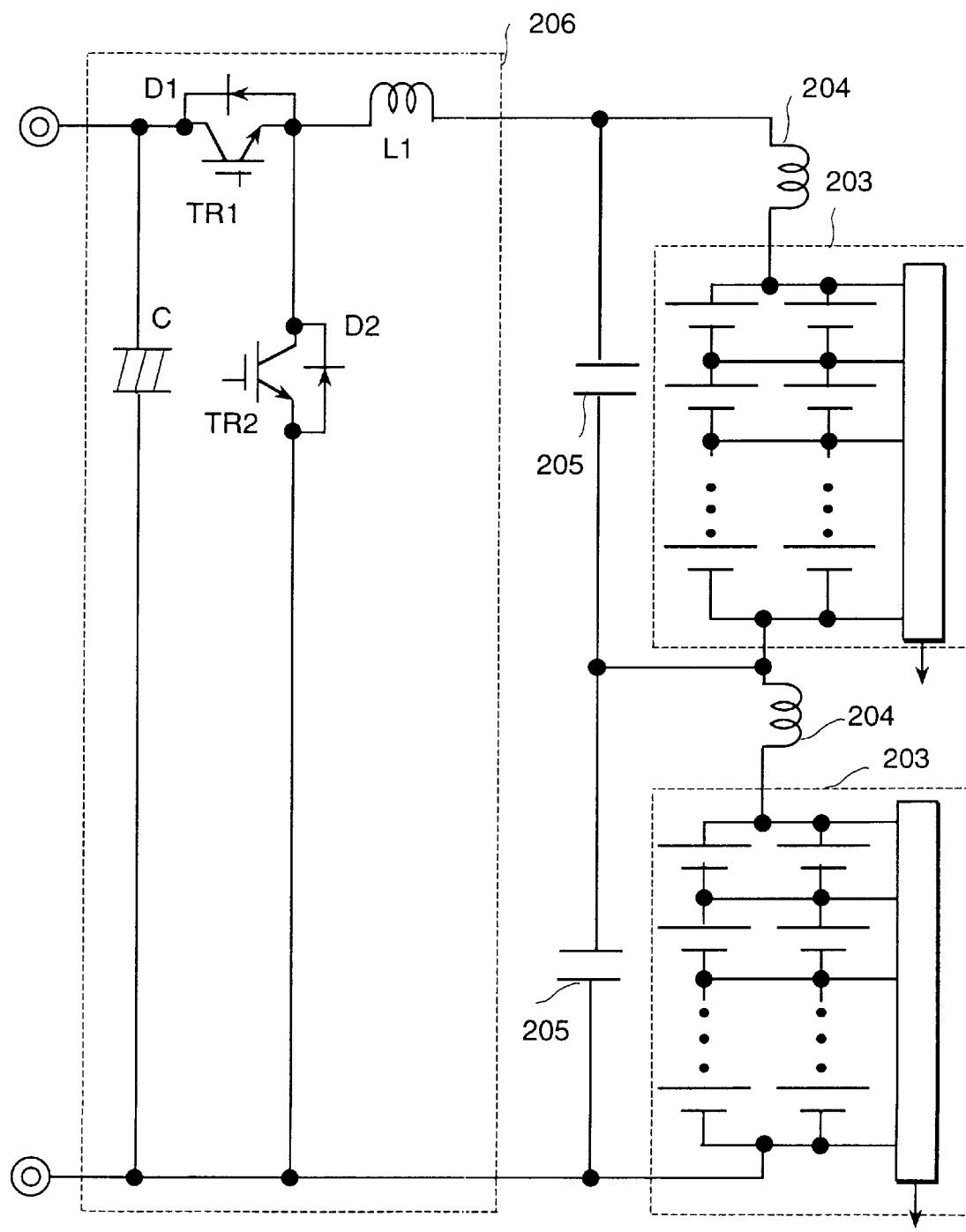
FIG. 12 is a schematic circuit diagram showing a tenth embodiment in accordance with the present invention.

FIG. 12 is a circuit diagram showing a tenth embodiment in accordance with the present invention. An inductor 204 is inserted in series with a battery module 203, and a capacitor 205 is connected in parallel with the series connection portions of the battery module 203 and the inductor 204. A unit is formed of the series connection of a battery module 203 and an inductor 204 and a capacitor 205, and a plurality of units are connected in series to form a battery module group. At the same time, a chopper type electric power converter 206 is connected to the battery module group.

Therefore, similar to the ninth embodiment, with regard to the high frequency components of the electric power (the ripple components) produced during charging and discharging operations of the chopper type electric power converter 206, the inductor 204 inserted in series with the battery module 203 becomes a high impedance and the capacitor 205 connected in parallel with the battery module 203 becomes a low impedance. Therefore, the high frequency components of the electric power, that is, the ripple components, are not allowed to pass through the inductance 204, which represents a high impedance thereto, but they are by-passed through the low impedance capacitor 205. On the other hand, with regard to direct current power, the inductor 204 inserted in series with the battery module 203 appears as a low impedance, and the capacitor 205 connected in parallel to the battery module 203 appears as a high impedance. Therefore, the direct current power does not pass through the high impedance capacitor 205, but passes through the low impedance inductor 204.

Thereby, the high frequency components of the electric power, which produce bad effects on the battery 201 and the battery control circuit 202, are not allowed to pass through the battery 201 and the battery control circuit 202, but are by-passed by the capacitor 205. On the other hand, direct current power necessary for the battery 201 and the battery control circuit 202 can readily pass through the battery 201 and the battery control circuit 202 via the inductor 204.

Particularly, when many unit batteries 201 are connected in series, the capacitor 205 connected across the series connection of the batteries needs to be set to a high withstand voltage, and therefore, the capacitor 205 becomes large in size and high in cost. However, since each of the capacitors 205 is connected to a respective battery module 203, the withstand voltage of the capacitor 205 can be suppressed to a low value corresponding to the voltage of the battery module 203.

Therefore, the ripple components in the voltage and current can be reduced to improve the detecting accuracy and the reliability of the voltage and the current, and the temperature rise of the unit batteries can be reduced to improve the safety, the life and the performance of the unit batteries. In addition, the battery apparatus can be made light in weight, small in size, low in cost and high in safety. Further, a large current and high voltage battery apparatus can be made.

Figure 13:
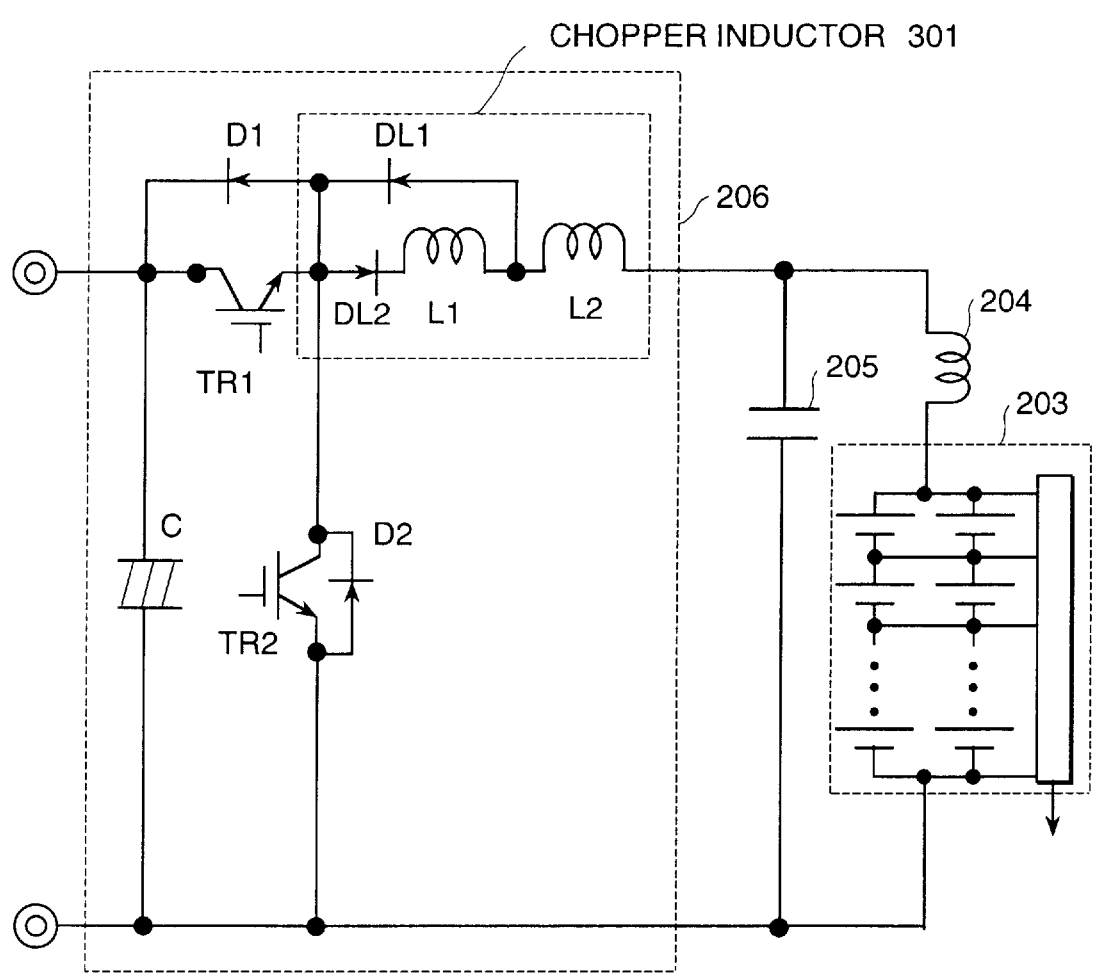
FIG. 13 is a schematic circuit diagram showing a eleventh embodiment in accordance with the present invention.

FIG. 13 is a circuit diagram showing an eleventh embodiment in accordance with the present invention. In the figure, the reference character 301 denotes a chopper inductor. The chopper inductor 301 is constructed such that two inductors L1, L2 are connected in series, and a rectifier DL2 is connected in series with inductor L1, and a rectifier DL1 is connected in parallel with the series connection of the inductor L1 and the rectifier DL2 so as to have an inverse polarity relative to the rectifier DL2.

The battery apparatus is constructed with the battery module 203 composed of a plurality of unit batteries 201 and the chopper type electric power converter 206, including the chopper inductor 301.

In the present embodiment, the inductors L1, L2 are formed as one inductor, but may be constructed with a plurality of inductors. Further, in the present embodiment, diodes are used for the rectifiers, but thyristors or diodes also may be used.

According to this embodiment, during the battery discharging period, current does not flow through the inductor L1, since it is blocked by the rectifier DL2, but flows through the rectifier DL1. Therefore, the inductance of the chopper inductor 301 during the battery discharging period is equal to the inductance of L2. On the other hand, during the battery charging period, current flows through the inductor L1, the rectifier DL2 and the inductor L2, but is blocked by the rectifier DL1. Therefore, the inductance of the chopper inductor 301 during the battery charging period becomes the sum of the inductances of L1 and L2. That is, the inductance of the chopper inductor 301 is larger during the battery charging period than during the battery discharging period.

Comparing values of the current during the charging period and at discharging period, the value of current during the charging period is generally set to a value smaller than the value of current during the discharging period. The reason is that there is a sufficient recharging time due to a small frequency of occurrence of power failures and a short time of power failure, as in an uninterruptible power supply system, and so the efficiency of charging is improved.

Comparing the accuracies of detecting and controlling the current during the charging period and the discharging period, the accuracy during the charging period is generally required to be higher than the accuracy during the discharging period. The reason is that it is necessary to perform detection and control of a very small current when recharging termination is detected by a current value, when a charged amount is calculated by accumulation of current values, or when the unit batteries 201 are charged so as to be rescued from an over-discharging state.

Therefore, by setting the inductance of the chopper inductor 301 during the charging period to a large value, as described above, the accuracies of current detection and current control during the charging period can be improved by decreasing the ripples. Further, since the current value during charging is small, the battery apparatus can be made light in weight, small in size and low in cost, even though the inductor L1 has a large value of inductance. Since the values of the inductance and the rated current of the chopper inductor 301 can be optimized during both the charging and the discharging periods, the chopper inductor 301 can be made light in weight, small in size and low in cost.

Figure 14:
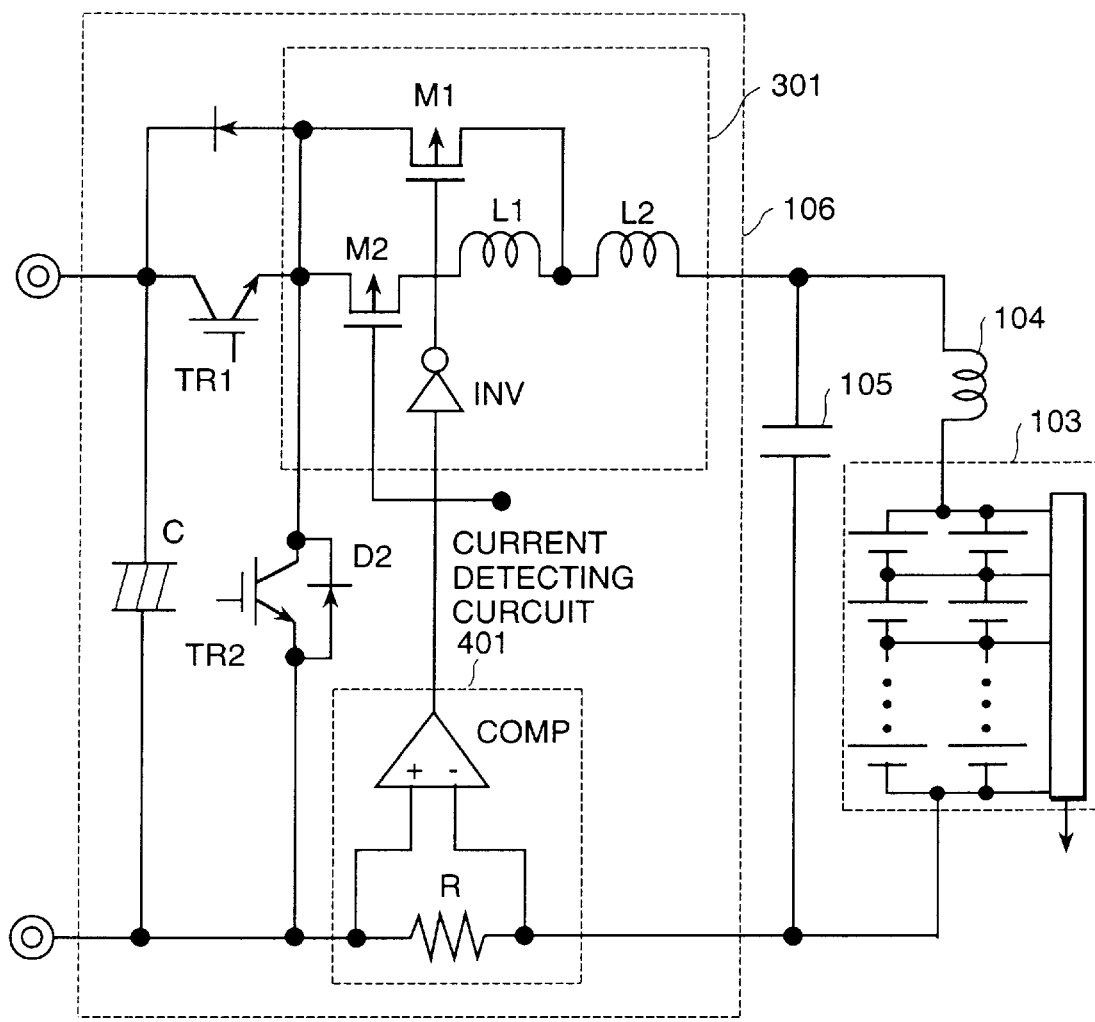
FIG. 14 is a schematic circuit diagram showing a twelfth embodiment in accordance with the present invention.

FIG. 14 is a circuit diagram showing a twelfth embodiment in accordance with the present invention. The reference character 401 designates a current detecting circuit. Although the current detecting circuit 401 in this embodiment is constructed with a shunt resistor R and a comparator COMP, another configuration is acceptable.

In the chopper inductor 301, two inductors L1, L2 are connected in series, a p-type MOS transistor M2 is connected in series with the inductor L1 and operates as a switch, and another p-type MOS transistor M1 is in parallel with the series connection of the inductor L1 and the p-type MOS transistor M2. A gate of the p-type MOS transistor M2 and a gate of the p-type MOS transistor M1 are connected to outputs of the comparator COMP.

The battery apparatus is constructed with the battery module 203, composed of a plurality of unit batteries 201, and the chopper type electric power converter 206, including the chopper inductor 301 and the current detecting circuit 401.

In the present embodiment, the inductors L1, L2 are formed as one inductor, but may be constructed with a plurality of inductors. Further, in the present embodiment, p-type MOS transistors are used, but elements of another type such as thyristors or relays may be used.

According to this embodiment, during the battery discharging period, current does not flow through the inductor L1, due to opening of the p-type MOS transistor M2, but flows through the closed p-type MOS transistor M1. Therefore, the inductance of the chopper inductor 301 during the battery discharging period is equal to is equal to the inductance of L2. On the other hand, during the battery charging period, current flows only through the inductor L1, the p-type MOS transistor M2 and the inductor L2, due to opening of the p-type MOS transistor M1. Therefore, the inductance of the chopper inductor 301 during the charging period becomes the sum of the inductances of L1 and L2. That is, the inductance of the chopper inductor 301 is larger during the battery charging period than during the battery discharging period.

Therefore, similar to the third embodiment, by setting the inductance of the chopper inductor 301 during the battery charging period to a large value, as described above, the accuracies of current detection and current control during the charging period can be improved by decreasing the ripples. Further, since the current value during charging is small, the battery apparatus can be made light in weight, small in size and low in cost, even though the inductor L1 has a large value of inductance.

Since the values of the inductance and the rated current of the chopper inductor 301 can be optimized during both the charging and the discharging periods, the chopper inductor 301 can be made light in weight, small in size and low in cost.

Further, the current detecting circuit 401 in this embodiment is constructed so as to bidirectionally detect the current, and the value of inductance of the chopper inductor 301 is changed during the charging period and during the discharging period depending on the detected value. However, the switches can be arbitrarily operated by constructing the current detecting circuit so that the current value also can be identified using an operational amplifier or a micro-computer.

Particularly, in the above-described configuration, when recharging termination is detected by a current value, when a charged amount is calculated by accumulation of current values, or when the unit batteries 201 are charged so as to be rescued from an over-discharging state, the value of the inductance of the chopper inductor 301 can be increased, and, accordingly, detection and control of a very small current can be performed.

Figure 15:
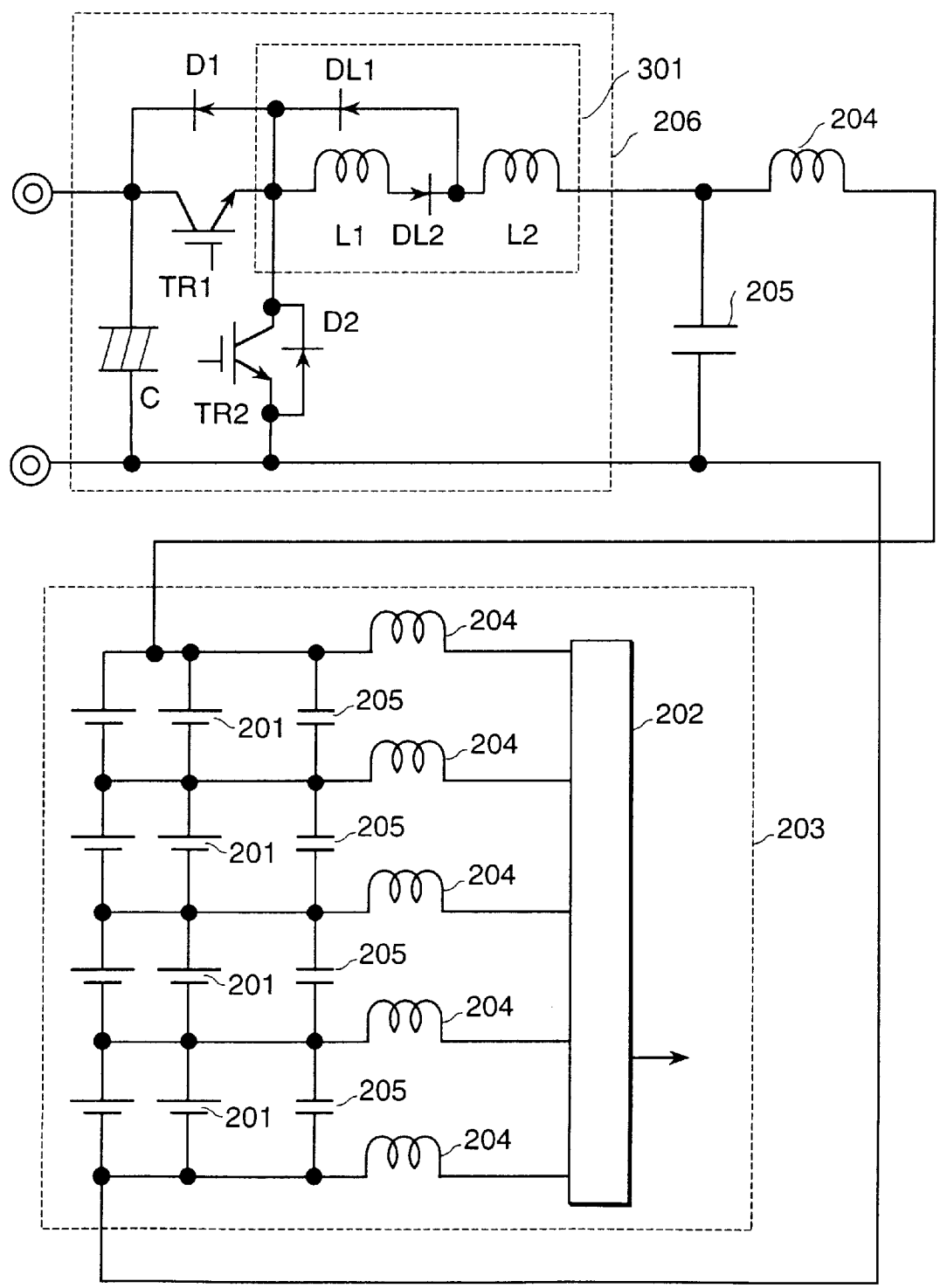
FIG. 15 is a schematic circuit diagram showing a thirteenth embodiment in accordance with the present invention.

FIG. 15 is a circuit diagram showing a thirteenth embodiment in accordance with the present invention. In the battery module 203, a plurality of unit batteries 201 are connected in series, a capacitor 204 is connected in parallel with each of the unit batteries 201, and the ends of each capacitor are connected to a battery control circuit 202 through an inductor 204.

The battery apparatus is constructed with the battery module 203 composed of a plurality of unit batteries 201 and the chopper type electric power converter 206. The chopper type electric power converter 206 in this embodiment is a bidirectional step-up and step-down chopper circuit. The chopper type electric power converter 206 also may be constructed using a unidirectional step-up chopper circuit and a unidirectional step-down chopper circuit.

According to the present invention, the inductor 204 becomes a high impedance and the capacitor 205 connected in parallel with a unit battery 201 becomes a low impedance to the high frequency components of the electric power (the ripple components). Therefore, the high frequency components of the electric power, that is, the ripple components are not allowed to pass through the inductor 204, which appears as a high impedance thereto, but are by-passed through the low impedance capacitor 205.

On the other hand, the inductor 204 appears as a low impedance and the capacitor 205 appears as a high impedance to the direct current power. Therefore, the direct current power does not pass through the capacitor 205, which appears as a high impedance thereto, but passes through the low impedance inductor 204.

Thereby, the high frequency components of the electric power, which produce bad effects on the battery 201 and the battery control circuit 202 are not allowed to pass through the battery 201 and the battery control circuit 202, but are by-passed by the capacitor 205. On the other hand, direct current power necessary for the battery 201 and the battery control circuit 202 can readily pass through the battery 201 and the battery control circuit 202 via the inductor 204.

Therefore, the ripple components in the voltage and current can be reduced to improve the detecting accuracy and the reliability of the voltage and the current. The temperature rise of the unit batteries also can be reduced to improve the safety, the life and the performance of the batteries. The battery apparatus can be made light in weight, small in size, low in cost and high in safety.

Figure 16:
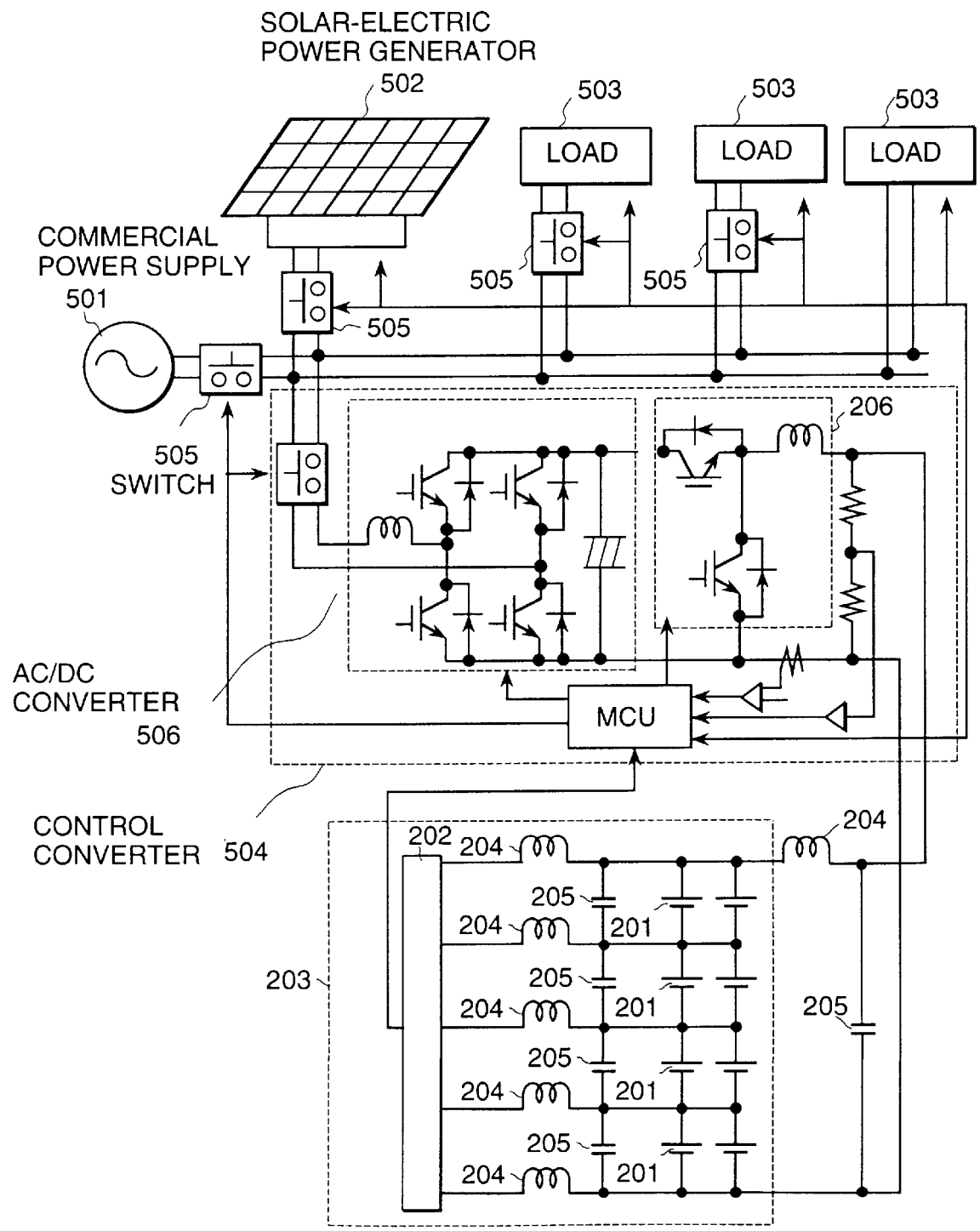
FIG. 16 is a schematic circuit diagram showing a fourteenth embodiment in accordance with the present invention.

FIG. 16 is a circuit diagram showing a fourteenth embodiment in accordance with the present invention. In the figure, the reference character 501 denotes a commercial power supply, the reference character 502 denotes a solar-electric power generator, the reference character 503 denotes loads, the reference character 504 denotes a control converter, the reference character 505 denotes a switch and the reference character 506 denotes an AC/DC converter.

The control converter 504 comprises a chopper type electric power converter 206 composed of a AC/DC converter 506 and a step-up and step-down chopper circuit. The battery module 203 is connected to the chopper type electric power converter 206 through an inductor 204. A capacitor 205 is connected across the series connection of the battery module 203 and the inductor 204.

On the other hand, the solar-electric power generator 502, the loads 503 and the control converter 504 are connected to the common commercial power supply 501 through the switches 505, respectively. At the same time, the solar-electric power generator 502, the loads 503, the control converter 504, the switches 505 and the battery control circuit 202 are connected to an MCU in the control converter 504 by way of a bidirectional signal system.

The solar-electric power generator 502 is an apparatus for converting solar light to direct current electric power using a solar battery and for outputting alternating current electric power using an inverter.

The loads 503 are electric appliances, such as an air-conditioner, a refrigerator, a microwave oven, lighting and electric machines, such as a motor, a computer and medical equipment.

The control converter 504 is composed of an electric power converter for converting alternating current electric power to direct current electric power and for converting direct current electric power to alternating current electric power using the AC/DC converter 506 and a charging and discharging unit using the chopper type electric power converter 206. Further, the control converter 504 is composed of a control unit for controlling the charging and discharging operations and also for controlling the above-mentioned machines, such as the solar-electric power generator 502, the loads 503 and so on.

In some cases, these machines have the switches 505 mounted inside the system. Further, the battery apparatus in accordance with the present invention may be formed in a connecting configuration of the control converter 504 and the other machines, which is different than the configuration shown in the figure.

According to the configuration shown in the figure, when the commercial power supply 501 and the solar-electric power generator 502 can not to supply electric power as required by the loads 503, electric power is supplied from the batteries 201 through the control converter 504. On the other hand, when an excess electric power is supplied from the commercial power supply 501 and the solar-electric power generator 502, the excess electric power is used to charge the batteries 201 through the control converter 504.

This configuration can reduce a contract electric power capacity and the consumed electric power of the commercial power supply 501 and the rated electric power generation of the solar-electric power generator, and, accordingly, the cost of equipment and the operating costs can be reduced.

Electric power is supplied from the unit batteries 201 to supplement the commercial power supply 501 in a certain time period when electric power is concentratively consumed, and the battery apparatus is charged up in a certain time period when less electric power is consumed. By doing so, the consumption of electric power can be made more uniform.

Further, since the control converter 504 monitors electric power consumed by the loads 503 and controls the loads 503, energy saving and effective use of electric power can be achieved.

Of course, high frequency components of the electric power (ripple) are generated in these operations, but, as described above, the ripple in the voltage and current can be reduced to improve the detecting accuracy and the reliability of the voltage and the current, and the temperature rise of the batteries can be reduced to improve the safety, the life and the performance of the batteries, and the battery apparatus can be made light in weight, small in size, low in cost and high in safety. Further, a large current and high voltage battery apparatus can be made.

As described above, according to the present invention, it is possible to provide a battery apparatus in which ripples in the voltage and current are reduced.

Therefore, the present invention is useful for a battery, such as a lithium secondary battery or an electric double layer capacitor, and a battery apparatus comprising many unit batteries connected in series, evaluating apparatus for evaluating a battery or the like, equipment for manufacturing a battery or the like, and electric equipment, such as an uninterruptible electric power supply system using a battery or the like, or a battery apparatus of a motor for an electric bicycle or an electric vehicle.

What is claimed is:

1. A battery apparatus comprising:
   an electricity storing means having batteries;
   a first switching means connected to said electricity storing means;
   a first electric energy storing means which is selectively connected to said batteries of said electricity storing means through said first switching means;
   a second switching means connected to said first electric energy storing means; and
   a voltage detecting means having an input terminal which is selectively connected to said first electric energy storing means through said second switching means.

2. A battery apparatus according to claim 1, which further comprises a second electric energy storing means connected in parallel to said voltage detecting means between said second switching means and said voltage detecting means.

3. A battery apparatus according to any one of claim 1 and claim 2, wherein said first switching means and said second switching means are complimentarily switched on and off.

4. A battery apparatus according to claim 3, wherein said voltage detecting means detects a voltage input to said input terminal when said first switching means is switched off and said second switching means is switched on.

5. A battery apparatus according to any one of claim 1 and claim 2, wherein a battery is connected to said first electric energy storing means in a floating potential state through said first switching means.

6. A battery apparatus according to claim 5, wherein said first electric energy storing means is connected between said input terminal of said voltage detecting means and a reference potential terminal of said voltage detecting means in parallel with said voltage detecting means through said second switching means.

7. A battery apparatus according to claim 5, wherein said first electric energy storing means is selectively connected to one battery of a plurality of series connected batteries by said first switching means, said plurality of series connected batteries being provided in said electricity storing means.

8. A battery apparatus according to claim 7, wherein said first electric energy storing means is connected between said input terminal of said voltage detecting means and a reference potential terminal of said voltage detecting means in parallel with said voltage detecting means through said second switching means.

9. A battery apparatus according to claim 7, wherein
   each of series connected said plurality of batteries is connected in parallel to a bypass circuit having switching elements,
   said voltage detecting means detects a voltage input to said input terminal when said first switching means is switched off and said second switching means is switched on, and
   said voltage detecting means controls switching-on-and-off of said switching elements according to said detected voltage.

10. A battery apparatus comprising:
    a plurality of electricity storing means having batteries, a respective first switching means connected to each electricity storing means, a respective first electric energy storing means selectively connected to said batteries of each electricity storing means through said respective first switching means, and a second switching means connected to said respective first electric energy storing means;
    a voltage detecting means having input terminals which are selectively connected to said respective first electric energy storing means through said second switching means; and
    a second electric energy storing means connected in parallel with said voltage detecting means between said second switching means and said voltage detecting means.

11. A control system for a battery apparatus comprising:
    a first switching means connected to a battery contained in an electricity storing means;
    a first electric energy storing means connected to said battery through said first switching means;
    a second switching means connected to said first electric energy storing means; and
    a voltage detecting means having an input terminal which is selectively connected to said first electric energy storing means through said second switching means.

12. A battery apparatus comprising a battery module composed of at least one battery; and a chopper type electric power converter, wherein an inductor is connected in series with said battery module, and a capacitor is connected between both ends of the series connection of said battery module and said inductor.

13. A battery apparatus comprising a battery module group formed by a plurality of battery modules, each composed of at least one battery, the plurality of battery modules being connected in series; and a chopper type electric power converter, wherein an inductor is connected in series with each of said battery modules, and a respective capacitor is connected between both ends of each series connection of a battery module and an inductor.

14. A battery apparatus comprising a battery module composed of at least one battery; and a chopper type electric power converter having a chopper inductor which comprises a plurality of inductors connected in series, a first rectifier connected in series with said inductors, a second rectifier connected between both ends of the series connection at least one of said inductors and said first rectifier so as to have an inverse polarity relative to said first rectifier.

15. A battery apparatus comprising a battery module composed of at least one battery; a chopper type electric power converter; and a current detecting circuit for detecting current flowing in said battery module, wherein said chopper type electric power converter has a chopper inductor which comprises a plurality of inductors connected in series, a first switching means connected in series with said inductors, a second switching means connected between both ends of the series connection at least one of said inductors and said switching means, said first and second switching means being switched in accordance with a detected value of said current detected by said current detecting circuit.

16. A battery apparatus comprising a battery module composed of at least one battery; a chopper type electric power converter; and a battery control circuit, wherein said battery is connected to a capacitor in parallel, and said battery control circuit is connected to said battery and said capacitor in parallel through an inductor.

* * * * *